United States Patent
Kusakabe et al.

(10) Patent No.: US 11,614,835 B2
(45) Date of Patent: Mar. 28, 2023

(54) INFORMATION PROCESSING DEVICE THAT PROJECTS DRAWING INFORMATION ACCORDING TO RATIO OF DISTANCES, INFORMATION PROCESSING METHOD, AND RECORDING MEDIUM

(71) Applicant: SONY GROUP CORPORATION, Tokyo (JP)

(72) Inventors: Yuri Kusakabe, Tokyo (JP); Kentaro Ida, Tokyo (JP); Yu Aoki, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/428,824

(22) PCT Filed: Jan. 10, 2020

(86) PCT No.: PCT/JP2020/000598
§ 371 (c)(1),
(2) Date: Aug. 5, 2021

(87) PCT Pub. No.: WO2020/166242
PCT Pub. Date: Aug. 20, 2020

(65) Prior Publication Data
US 2022/0129110 A1    Apr. 28, 2022

(30) Foreign Application Priority Data
Feb. 14, 2019   (JP) .............................. JP2019-024870

(51) Int. Cl.
*G06F 3/042*   (2006.01)
*G06F 3/03*    (2006.01)
*G06F 3/0346*  (2013.01)

(52) U.S. Cl.
CPC .......... *G06F 3/0425* (2013.01); *G06F 3/0325* (2013.01); *G06F 3/0346* (2013.01)

(58) Field of Classification Search
None
See application file for complete search history.

(56) References Cited

U.S. PATENT DOCUMENTS

| | | | |
|---|---|---|---|
| 2009/0040178 A1* | 2/2009 | Machida | G06F 3/0346 345/158 |
| 2012/0044140 A1* | 2/2012 | Koyama | G06F 3/04883 345/157 |
| 2014/0192089 A1* | 7/2014 | Honda | G06F 3/0416 345/661 |

FOREIGN PATENT DOCUMENTS

| | | | |
|---|---|---|---|
| CN | 102591531 A | * | 7/2012 |
| JP | 2003-085590 A | | 3/2003 |

(Continued)

OTHER PUBLICATIONS

International Search Report and Written Opinion of PCT Application No. PCT/JP2020/000598, dated Mar. 24, 2020, 12 pages of ISRWO.

*Primary Examiner* — Kirk W Hermann
(74) *Attorney, Agent, or Firm* — Chip Law Group

(57) ABSTRACT

An information processing device comprising a projection control unit that controls projection of drawing information, the projection being performed by a projection device, on a basis of ratio information between a first distance and a second distance, the first distance being acquired from sensing information regarding a drawing tool and being from a reference point to the drawing tool, and the second distance being from the reference point to an intersection point between a straight line connecting the reference point with the drawing tool and a calibration plane.

19 Claims, 17 Drawing Sheets

(56) References Cited

FOREIGN PATENT DOCUMENTS

| | | | | | |
|---|---|---|---|---|---|
| JP | 2003085590 | A | * | 3/2003 | |
| JP | 2006-302029 | A | | 11/2006 | |
| JP | 2006302029 | A | * | 11/2006 | |
| JP | 2009032027 | A | * | 2/2009 | |
| JP | 2010-079458 | A | | 4/2010 | |
| JP | 2012-003521 | A | | 1/2012 | |
| JP | 4858631 | B2 | * | 1/2012 | ............ G06F 3/041 |
| JP | 2012-043176 | A | | 3/2012 | |
| JP | 2014-134613 | A | | 7/2014 | |
| JP | 2018-013858 | A | | 1/2018 | |
| JP | 2018160265 | A | * | 10/2018 | ............ G06F 3/017 |
| WO | 2011/158401 | A1 | | 12/2011 | |
| WO | 2018/154634 | A1 | | 8/2018 | |

\* cited by examiner

INFORMATION PROCESSING DEVICE THAT PROJECTS DRAWING INFORMATION ACCORDING TO RATIO OF DISTANCES, INFORMATION PROCESSING METHOD, AND RECORDING MEDIUM

This application is a U.S. National Phase of International Patent Application No. PCT/JP2020/000598 filed on Jan. 10, 2020, which claims priority benefit of Japanese Patent Application No. JP 2019-024870 filed in the Japan Patent Office on Feb. 14, 2019. Each of the above-referenced applications is hereby incorporated herein by reference in its entirety.

TECHNICAL FIELD

The present disclosure relates to an information processing device, an information processing method, and a recording medium.

BACKGROUND ART

In recent years, there has emerged a drawing system in which, when the user moves a drawing tool on a drawing surface in a real space, a projection device such as a projector projects the information such as a line indicating the trail of the drawing tool (hereinafter also referred to as drawing information) on the drawing surface. For example, Patent Document 1 listed below discloses a technology for improving user convenience in such a drawing system.

Such a drawing system typically includes an imaging device and a projection device, and performs a calibration in advance for generating a projective transformation matrix H between the imaging device and the projection device using a predetermined plane for calibration (hereinafter also referred to as a calibration plane). Then, by using such a projective transformation matrix H to project the drawing information, the drawing system is allowed to ensure that the position of the drawing tool on the calibration plane matches the position of the drawing information. As a result, the user can comfortably perform a drawing operation as if the user actually writes to a real space with a pen or the like.

CITATION LIST

Patent Document

Patent Document 1: Japanese Patent Application Laid-Open No. 2014-134613

SUMMARY OF THE INVENTION

Problems to be Solved by the Invention

Typically, a calibration is performed by using the drawing surface as a calibration plane. As a result, the position of the drawing tool on the drawing surface and the position of drawing information projected on the drawing surface are matched. However, when the drawing surface and the calibration plane differ from each other, the position of the drawing tool on the drawing surface and the position of drawing information projected on the drawing surface may be mismatched. This is because a calibration is performed merely for the purpose of suppressing a mismatch of positions on the calibration plane.

Thus, the present disclosure provides a mechanism capable of suppressing the occurrence of a mismatch between the position of a drawing tool on a drawing surface and the position of drawing information projected on the drawing surface in a case where the calibration plane and the drawing surface differ from each other.

Solutions to Problems

According to the present disclosure, there is provided an information processing device including: a projection control unit that controls projection of drawing information, the projection being performed by a projection device, on the basis of ratio information between a first distance and a second distance, the first distance being acquired from sensing information regarding a drawing tool and being from a reference point to the drawing tool, and the second distance being from the reference point to an intersection point between a straight line connecting the reference point with the drawing tool and a calibration plane.

Furthermore, according to the present disclosure, there is provided an information processing method including: controlling projection of drawing information, the projection being performed by a projection device, on the basis of ratio information between a first distance and a second distance, the first distance being acquired from sensing information regarding a drawing tool and being from a reference point to the drawing tool, and the second distance being from the reference point to an intersection point between a straight line connecting the reference point with the drawing tool and a calibration plane.

Furthermore, according to the present disclosure, there is provided a recording medium recording a program that causes a computer to function as: a projection control unit that controls projection of drawing information, the projection being performed by a projection device, on the basis of ratio information between a first distance and a second distance, the first distance being acquired from sensing information regarding a drawing tool and being from a reference point to the drawing tool, and the second distance being from the reference point to an intersection point between a straight line connecting the reference point with the drawing tool and a calibration plane.

MODE FOR CARRYING OUT THE INVENTION

Figure 1:
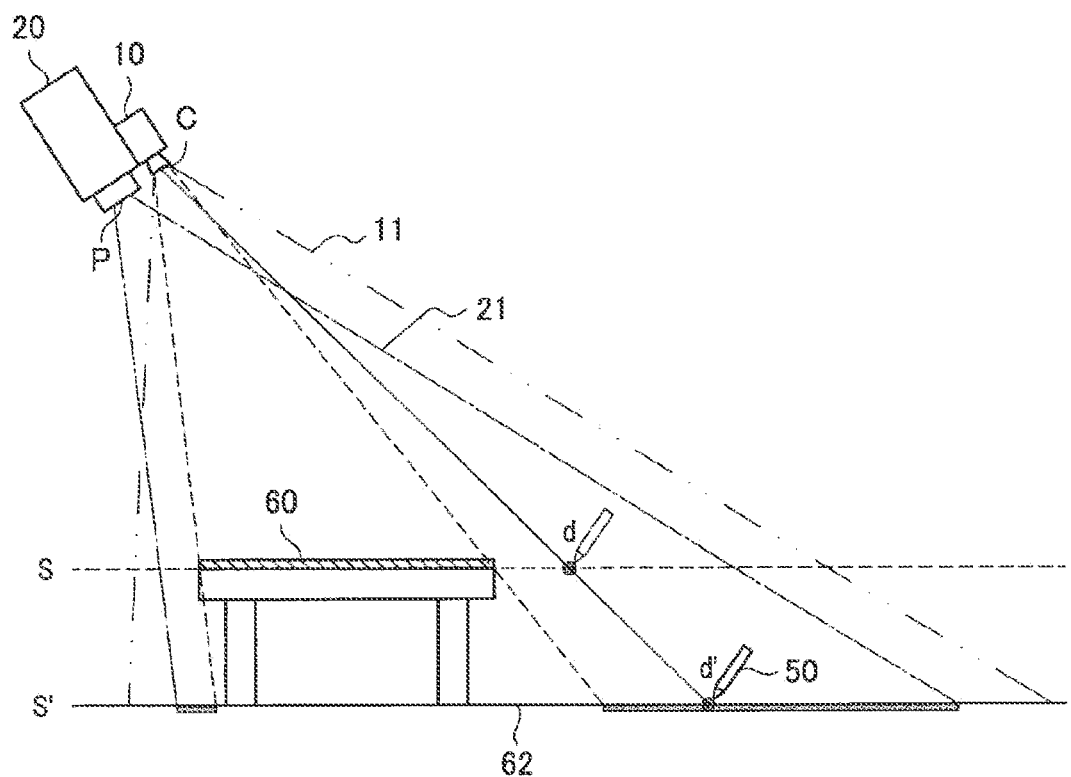
FIG. 1 is a diagram for providing an overview of a drawing system according to an embodiment of the present disclosure.

Preferred embodiments of the present disclosure will now be described in detail with reference to the accompanying drawings. Note that, in the description and the drawings, components having substantially the same functions and configurations are denoted by the same reference numerals and duplicate descriptions are omitted.

Note that descriptions will be provided in the order shown below.

1. Introduction
2. Example configuration
3. Technical features
3.1. Acquiring position of digital pen
3.2. Preliminary process
3.3. Projection control
4. Modifications
4.1. First modification
4.2. Second modification
4.3. Third modification
4.4. Fourth modification
5. Example hardware configuration
6. Conclusion

1. INTRODUCTION

FIG. 1 is a diagram for providing an overview of a drawing system 1 according to an embodiment of the present disclosure. As illustrated in FIG. 1, the drawing system 1 includes an imaging unit 10, a projection unit 20, and a digital pen 50.

The imaging unit 10 is an imaging device that captures an image of a real space. The imaging unit 10 includes a lens system, a drive system, and an imaging element for an RGB camera or the like to capture images (still images or moving images). The imaging unit 10 captures an image of a real space included in an imaging angular field of view 11. The imaging angular field of view 11, which refers to an imaging range, is defined by the position of the imaging unit 10 (hereinafter also referred to as a camera position C), the imaging direction, and the angle of an imaging range with the imaging direction being a central axis. An image captured by the imaging unit 10 is also referred to as a captured image.

The projection unit 20 is a projection device that projects an image on some place in the real space. The projection unit 20 projects an image in a real space included in a projection angular field of view 21. The projection angular field of view 21, which refers to a projectable range, is defined by the position of the projection unit 20 (hereinafter also referred to as a projector position P), the projecting direction, and the angle of a projectable range with the projecting direction being a central axis. An image projected by the projection unit 20 is also referred to as a projected image. Note that it is assumed that a projected image is an image projected on the entire projection angular field of view 21, and the drawing information corresponding to user operation of the digital pen 50 is mapped and projected in the projected image.

The digital pen 50 is a drawing tool in which a light-emitting part such as an infrared (IR) part, a light-emitting diode (LED), or the like is mounted on the pen tip. The light-emitting part emits light when, for example, a button, a switch, or the like disposed on the digital pen 50 is operated, the pen tip is pressed against a contact surface, or the pen is shaken. In addition, the digital pen 50 may transmit a predetermined command based on a user operation of a button or a switch disposed on the digital pen 50, movement of the pen, or the like to a projection control unit 40, which is described later.

In a case where the imaging angular field of view 11 and the projection angular field of view 21 are different as shown in FIG. 1, a calibration for generating a projective transformation matrix H between the imaging unit 10 and the projection unit 20 is performed in advance by using a calibration plane S. In the example illustrated in FIG. 1, a tabletop surface 60 is used as the calibration plane S. Then, when the user moves the digital pen 50 on a drawing surface S', an image thereof is captured by the imaging unit 10, and the drawing information representing the trail of the digital pen 50 as a line is projected onto the drawing surface S' by the projection unit 20. For example, the drawing information is projected onto the position of the digital pen 50 (more technically, the position of the bright spot of the pen tip). In the example illustrated in FIG. 1, a floor surface 62 included in the projection angular field of view 21 except the tabletop surface 60 is used as the drawing surface S'.

Note that the calibration plane S is a plane including the plane on a surface of the calibration target object and a plane obtained by virtually extending the plane on the surface of the calibration target object. In the example illustrated in FIG. 1, the calibration target object is the tabletop surface 60, and the calibration plane S includes the tabletop surface 60 and a plane obtained by virtually extending the tabletop surface 60. It is assumed here that the calibration plane S and the drawing surface S' are parallel.

In the example illustrated in FIG. 1, it is assumed that the digital pen 50 is located at a position d' on the drawing surface S'. In addition, the intersection point between the straight line that connects the camera position C with the position d' of the digital pen 50 and the calibration plane S is denoted as a position d. In this case, the coordinates of the digital pen 50 in a captured image are the same regardless of whether the digital pen 50 is located at the position d on the calibration plane S or the digital pen 50 is located at the position d' on the drawing surface S'. This matter is explained below with reference to FIG. 2.

Figure 2:
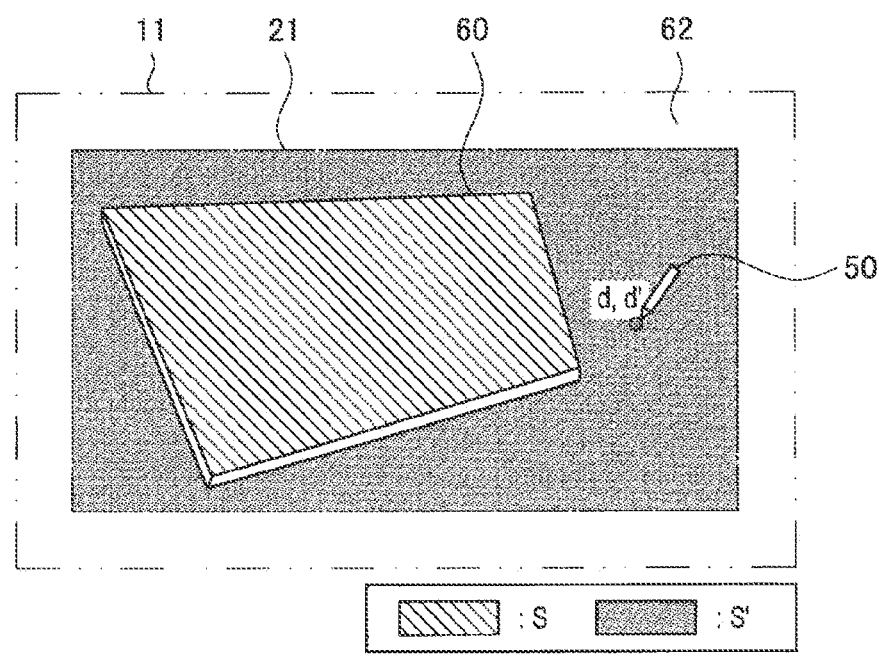
FIG. 2 is a diagram illustrating an example of a captured image captured by an imaging unit in the state illustrated in FIG. 1.

FIG. 2 is a diagram illustrating an example of a captured image captured by the imaging unit 10 in the state illustrated in FIG. 1. The captured image shows the state of the real space included in the imaging angular field of view 11 as seen from the camera position C. The captured image shows the floor surface 62 and the tabletop surface 60 in the imaging angular field of view 11. In the captured image, the tabletop surface 60 is the calibration plane S, while the floor surface 62 included in the projection angular field of view 21 except the tabletop surface 60 is the drawing surface S'. Since the captured image is a two-dimensional image, the distance along a depth direction of the digital pen 50 as seen from the imaging unit 10 is unknown. Therefore, the coordinates of the digital pen 50 in the captured image are the same regardless of whether the digital pen 50 is located at the position d on the calibration plane S or the digital pen 50 is located at the position d' on the drawing surface S'. That is, letting $(x_d, y_d)$ be the coordinates of the position d in the captured image and letting $(x_{d'}, y_{d'})$ be the coordinates of the position d' in the captured image, $(x_d, y_d)=(x_{d'}, y_{d'})$ is satisfied.

In a case where a projective transformation matrix H on the calibration plane S is used as it is despite the fact that the distance along a depth direction from the imaging unit 10 to the calibration plane S is different from the distance from the imaging unit 10 to the drawing surface S', a mismatch occurs between the position of the digital pen 50 on the drawing surface S' and the position of the drawing information projected on the drawing surface S'. This matter is explained below with reference to FIG. 3.

Figure 3:
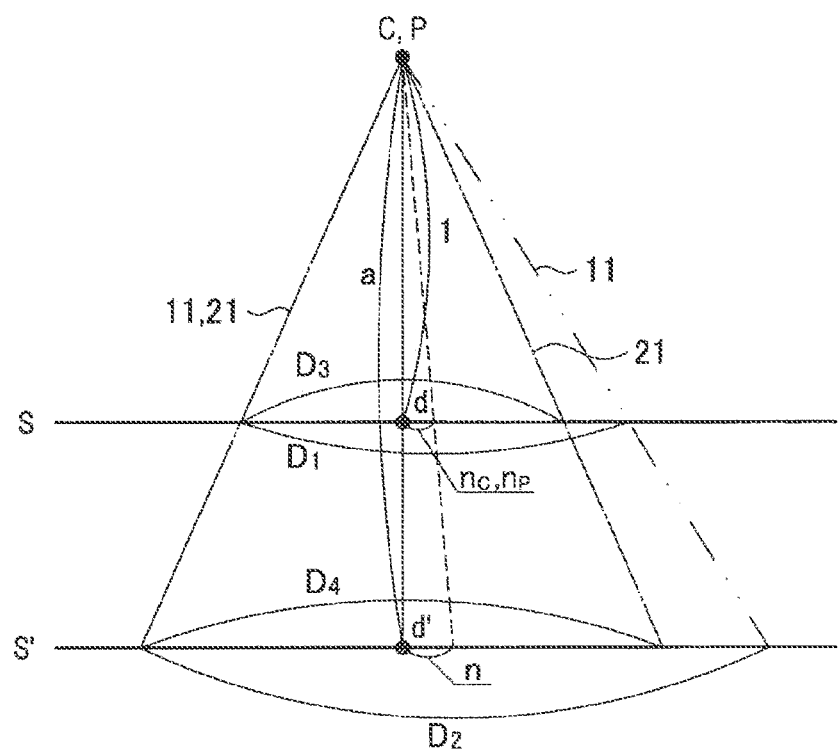
FIG. 3 is a diagram schematically showing a positional relationship among elements involved in the example illustrated in FIG. 1.

FIG. 3 is a diagram schematically showing a positional relationship among elements involved in the example illustrated in FIG. 1. FIG. 3 illustrates the camera position C and the projector position P at the same position on the assumption that the distance between the camera position C and the projector position P is negligibly small as compared with the distances therefrom to the calibration plane S and to the drawing surface S'. As shown in FIG. 3, the imaging angular field of view 11 and the projection angular field of view 21 are different. The width of the imaging angular field of view 11 on the calibration plane S is represented by $D_1$, while the width of the imaging angular field of view 11 on the drawing surface S' is represented by $D_2$. Furthermore, the width of the projection angular field of view 21 on the calibration plane S is represented by $D_3$, while the width of the projection angular field of view 21 on the drawing surface S' is represented by $D_4$.

According to laws of perspective, the size of a real object in a captured image is scaled up or down in accordance with the distance along a depth direction from the camera position C to the real object. For example, the ratio $r_C$ of the scaling amount of a real object in a captured image between the case where the real object is located on the calibration plane S and the case where the real object is located on the drawing surface S' is simply defined by the mathematical expression (1).

$$r_C = D_2/D_1 \quad (1)$$

Likewise, according to laws of perspective, the size of a real object in a projected image is scaled up or down in accordance with the distance along a depth direction from the projector position P to the real object. For example, the ratio $r_C$ of the scaling amount of a real object in a projected image between the case where the real object is located on the calibration plane S and the case where the real object is located on the drawing surface S' is simply defined by the mathematical expression (2).

$$r_P = D_4/D_3 \quad (2)$$

Then, in a case where the imaging angular field of view 11 and the projection angular field of view 21 are different, a difference arises between the scaling ratio $r_c$ in a captured image and the scaling ratio $r_P$ in a projected image. The difference in scaling ratio is the cause of a mismatch occurring between the position of the digital pen 50 on the drawing surface S' and the position of the drawing information projected on the drawing surface S'.

As shown in FIG. 3, given that the distance from the camera position C to the position d is 1, the distance from the camera position C to the position d' is represented by a, where a>1. Suppose that the digital pen 50 has been moved from the position d' by a distance n on the drawing surface S'. Then, the movement distance of the digital pen 50 in a captured image is calculated in accordance with the mathematical expression (3), where $n_c$ is the movement distance from the position d on the calibration plane S. Then, on the basis of the movement distance $n_c$, the drawing position of the drawing information is controlled.

$$n_c = r_c \times (1/a) \times n \quad (3)$$

On the other hand, the movement distance of the digital pen 50 in a projected image is calculated in accordance with the mathematical expression (4), where $n_p$ is the movement distance from the position d on the calibration plane S.

$$n_p = r_p \times (1/a) \times n \quad (4)$$

Here, as described above, $r_c \neq r_p$ is established when the imaging angular field of view 11 and the projection angular field of view 21 are different, and accordingly $n_c \neq n_p$ is established. Therefore, a mismatch occurs between the position of the digital pen 50 on the drawing surface S' and the position of the drawing information projected on the drawing surface S'.

Thus, the present disclosure proposes a technology for carrying out a process in accordance with the difference between the distance along a depth direction from the camera position C to the calibration plane S and the distance therefrom to the drawing surface S'. More specifically, according to the proposed technology, a projective transformation matrix H' specialized for the position d' on the drawing surface S' is calculated in real time in accordance with the difference in distance along a depth direction. Therefore, with respect to the position d', the difference in distance along a depth direction between the distance from the camera position C to the calibration plane S and the distance therefrom to the drawing surface S' is apparently eliminated, thereby preventing the occurrence of a difference between the above-described scaling ratios $r_C$ and $r_P$. As a result, suppressing the occurrence of a mismatch between the position of the digital pen 50 on the drawing surface S' and the position of the drawing information projected on the drawing surface S' can be achieved.

2. EXAMPLE CONFIGURATION

Figure 4:
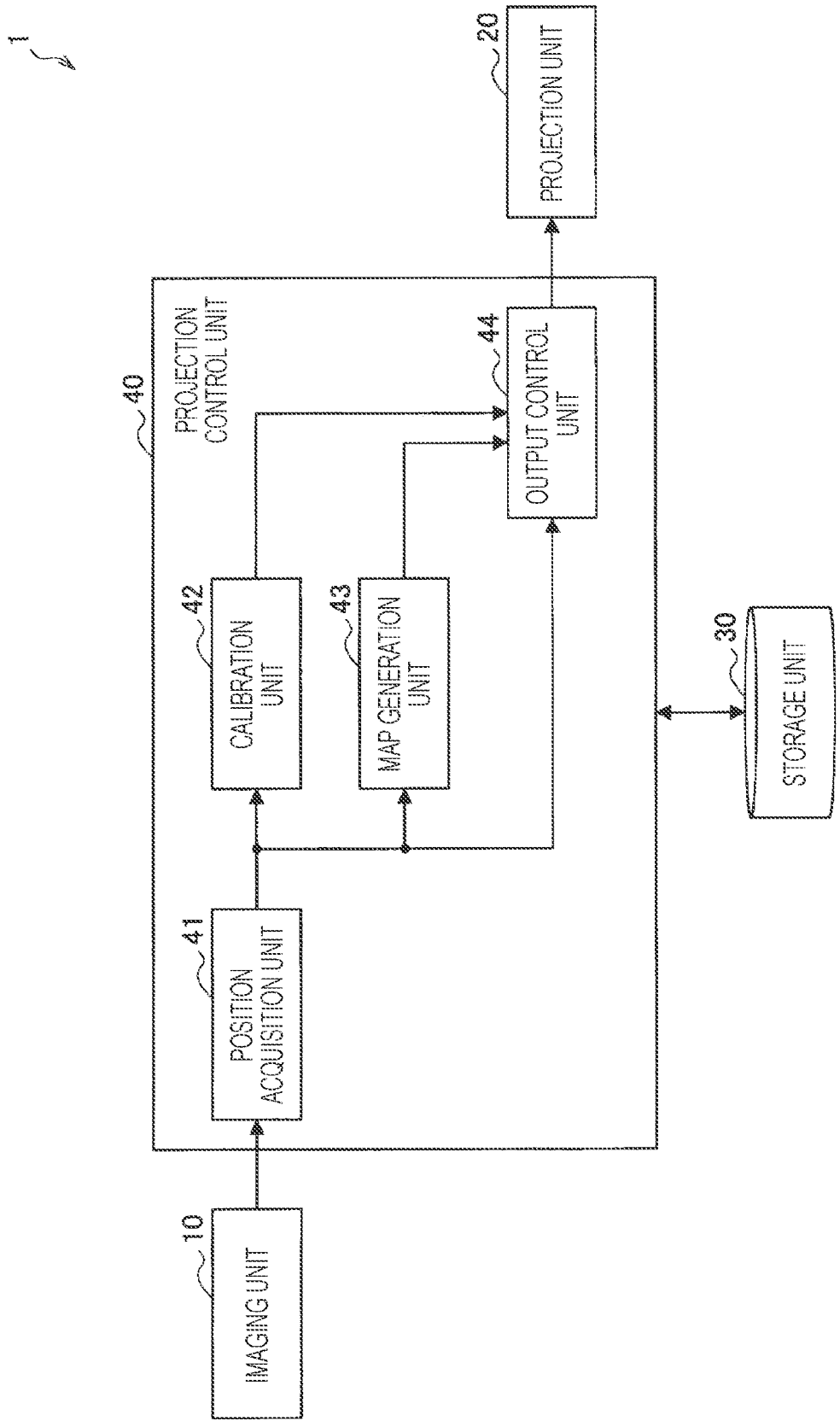
FIG. 4 is a block diagram illustrating an example of a functional configuration of the drawing system according to the present embodiment.

FIG. 4 is a block diagram illustrating an example of a functional configuration of the drawing system 1 according to the present embodiment. As illustrated in FIG. 4, the drawing system 1 includes a storage unit 30 and a projection control unit 40, in addition to the imaging unit 10, the projection unit 20, and the digital pen 50 that have been described with reference to FIG. 1. Note that illustration of the digital pen 50 is omitted in FIG. 4.

(1) Imaging Unit 10

The configuration of the imaging unit 10 is as described above. The imaging unit 10 outputs a captured image to a position acquisition unit 41.

(2) Projection Unit 20

The configuration of the projection unit 20 is as described above. The projection unit 20 projects a projected image under the control of an output control unit 44.

(3) Storage Unit 30

The storage unit 30 temporarily or permanently stores various types of information for operations of the drawing system 1. For example, the storage unit 30 stores a map M, which is described later.

(4) Projection Control Unit 40

The projection control unit 40, which functions as an arithmetic processing device and a control device, controls the overall operation in the drawing system 1 in accordance with various programs. As illustrated in FIG. 4, the projection control unit 40 includes the position acquisition unit 41, a calibration unit 42, a map generation unit 43, and the output control unit 44. The position acquisition unit 41, which has a function of acquiring the position of the digital pen 50, outputs the information indicating the position of the digital pen 50 to each of the calibration unit 42, the map generation unit 43, and the output control unit 44. The calibration unit 42, which has a function of performing a calibration, outputs a projective transformation matrix H generated through the calibration to the output control unit 44. The map generation unit 43, which has a function of generating a map M as described later, outputs the generated map M to the output control unit 44. The output control unit 44 has a function of performing projection control over a projected image on the basis of the position of the digital pen 50, the projective transformation matrix H, and the map M. Note that the projection control unit 40 may include any other function in addition to the functions fulfilled by these components.

3. TECHNICAL FEATURES

<3.1 Acquiring Position of Digital Pen>

The position acquisition unit 41 acquires the position of the digital pen 50 on the basis of sensing information regarding the digital pen 50. The position of the digital pen 50 herein refers to a concept including the distance from the camera position C to the digital pen 50 and the coordinates of the digital pen 50 in a captured image.

Acquiring Distance Along Depth Direction

Specifically, the position acquisition unit 41 acquires the distance from a reference point to the digital pen 50 on the basis of the sensing information. In the present embodiment, the sensing information is a captured image taken by the imaging unit 10. In addition, the position of the reference point is the position of the imaging unit 10 (that is, the camera position C). Note that the present embodiment regards the camera position C and the projector position P as the same position on the assumption that the distance between the camera position C and the projector position P is negligibly small as compared with the distances therefrom to the calibration plane S and to the drawing surface S'. In other words, the position of the reference point may be regarded as the projector position. Furthermore, the present embodiment assumes that the optical axes of the imaging unit 10 and the projection unit 20 coincide.

The position acquisition unit 41 may acquire the distance from the camera position C to the digital pen 50 on the basis of the size of a specific portion of the digital pen 50, the portion appearing in a captured image. Pursuant to laws of perspective, the size of a specific portion of the digital pen 50 appearing in a captured image is scaled up or down in accordance with the distance from the camera position C to the digital pen 50. Therefore, the position acquisition unit 41 acquires a smaller distance value as the size of a specific portion of the digital pen 50 appearing in a captured image is larger, and acquires a larger distance value as the size is smaller.

The specific portion may be, for example, a light-emitting part. In this case, the position acquisition unit 41 acquires the distance from the camera position C to the digital pen 50 on the basis of the size of the shape of light (for example, IR light or visible light) emitted from the light-emitting part of the digital pen 50, the shape appearing in a captured image. For example, in a case where the light-emitting part of the digital pen 50 is annular, the position acquisition unit 41 acquires the distance from the camera position C to the digital pen 50 on the basis of the size (area, radius, or the like) of the circle of light (hereinafter also referred to as a light-emitting circle) emitted from the light-emitting part of the digital pen 50 appearing in a captured image. It is hereinafter assumed that the specific portion is a light-emitting circle and the distance from the camera position C to the digital pen 50 is acquired on the basis of the radius of the light-emitting circle.

The acquired distance may be an actual distance. For example, the actual distance is acquired if the relationship between the radius of the light-emitting circle of the digital pen 50 appearing in a captured image and the actual distance from the camera position C to the digital pen 50 is defined in advance. Alternatively, the acquired distance may be information representing a distance. For example, the radius of the light-emitting circle of the digital pen 50 appearing in a captured image may be acquired as the information representing a distance.

Acquiring Coordinates in Captured Image

On the basis of the sensing information, the position acquisition unit 41 acquires the coordinates of the digital pen 50 in a captured image. For example, on the basis of the coordinates of a bright spot of the digital pen 50 appearing in a captured image, the position acquisition unit 41 acquires the coordinates of the digital pen 50 in the captured image.

Supplementary Information

Note that a specific portion of the digital pen 50 is not limited to the light-emitting circle. For example, in a case where a two-dimensional code such as a bar code is attached to the digital pen 50, the position of the digital pen 50 may be acquired by using the two-dimensional code.

<3.2. Preliminary Process>

(1) Calibration

The calibration unit 42 performs a calibration. Specifically, with regard to a point on the calibration plane S, the calibration unit 42 generates a projective transformation matrix H defining a relationship between the coordinates of the point in a captured image captured by the imaging unit 10 and the coordinates of the point in a projected image projected by the projection unit 20.

For the calibration, the projection unit 20 projects a projected image on the calibration plane S, and the imaging unit 10 captures the projected image projected on the calibration plane S. Then, the calibration unit 42 generates a projective transformation matrix H on the basis of the coordinates of a plurality of known points in the captured image of the projected image projected on the calibration plane S. Such coordinates are acquired by the position acquisition unit 41 on the basis of a captured image captured in a case where, for example, the digital pen 50 is positioned at the plurality of known points. The plurality of known points is, for example, vertices of a projected image.

In the example described with reference to FIG. 1, since the projection angular field of view 21 exceeds the tabletop surface 60, an image can be drawn on the floor surface 62. In this case, when an attempt is made to perform a calibration on the basis of vertices of a projected image projected on the whole projection angular field of view 21, it is difficult to recognize vertices of the projected image projected on the calibration plane S because such vertices exist in the air on the calibration plane S. Then, an auxiliary board may be used to allow vertices of a projected image to be projected on the calibration plane S. This matter is explained below with reference to FIG. 5.

Figure 5:
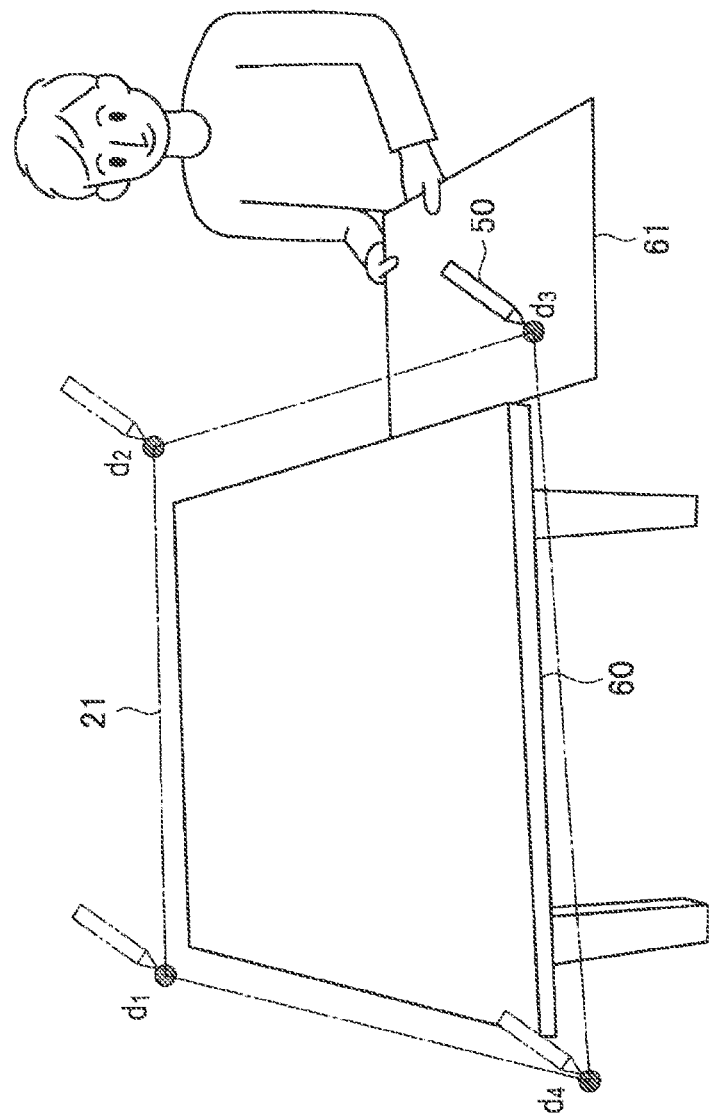
FIG. 5 is a diagram for explaining an example of a calibration with an auxiliary board according to the present embodiment.

FIG. 5 is a diagram for explaining an example of a calibration with the auxiliary board according to the present embodiment. The tabletop surface 60 illustrated in FIG. 5 is a plane of a surface of the calibration target object included in the calibration plane S. In this case, although an attempt is made to perform a calibration on the basis of vertices of a projected image projected on the whole projection angular field of view 21, such vertices exist in the air on the calibration plane S. Then, the user holds the auxiliary board 61 such that a surface of the auxiliary board 61 is located on a plane extended from the tabletop surface 60. As a result, a vertex $d_3$ of a projected image is projected on the calibration plane S as illustrated in FIG. 5, making it possible to obtain a captured image in which the digital pen 50 is positioned at the vertex $d_3$. The calibration unit 42 recognizes the position of the vertex $d_3$ in the captured image by recognizing the coordinates of the bright spot of the digital pen 50 in the captured image. A similar process is carried out on any other vertex, whereby the calibration unit 42 can recognize the coordinates of each of the vertices $d_1$ to $d_4$ of a projected image appearing in a captured image. Note that the auxiliary board 61 is a flat tool that may include any material and may have any shape.

(2) Generating Map M

The map generation unit 43 generates a map M that defines, with regard to each coordinate point in a captured image, the distance from the camera position C to the calibration plane S. Since the calibration plane S is a flat surface, it is assumed that the distance from the camera position C to each coordinate point on the calibration plane S varies one-dimensionally. Therefore, the map generation unit 43 calculates, with respect to each coordinate point on a captured image, the distance from the camera position C to the calibration plane S on the basis of the distances from the camera position C to a plurality of points on the calibration plane S and, on the basis of the calculation result, generates the map M.

The map M may be generated on the basis of the size of a specific portion of the digital pen 50 appearing in a captured image, in a case where the digital pen 50 is located at a plurality of points on the calibration plane S. For example, the map M is generated on the basis of the size of a light-emitting circle in a case where the digital pen 50 is located at a plurality of points on the calibration plane S. The plurality of points used for generating the map M may be a plurality of known points used for the calibration as described above. In this case, the calibration and generation of the map M are completed by, for example, simply locating the digital pen 50 at the vertices $d_1$ to $d_4$ of a projected image appearing in a captured image, and thus the burden on the user is reduced.

The distance defined in the map M may be an actual distance value or information representing the distance. Examples of the information representing the distance include the radius of the light-emitting circle of the digital pen 50 appearing in a captured image. In this case, the map M defines the radius of the light-emitting circle of the digital pen 50 expected to appear in a captured image, in a case where the digital pen 50 is located at a position on the calibration plane S, the position corresponding to each coordinate point in the captured image. A specific example of the generated map M is described below with reference to FIG. 6.

Figure 6:
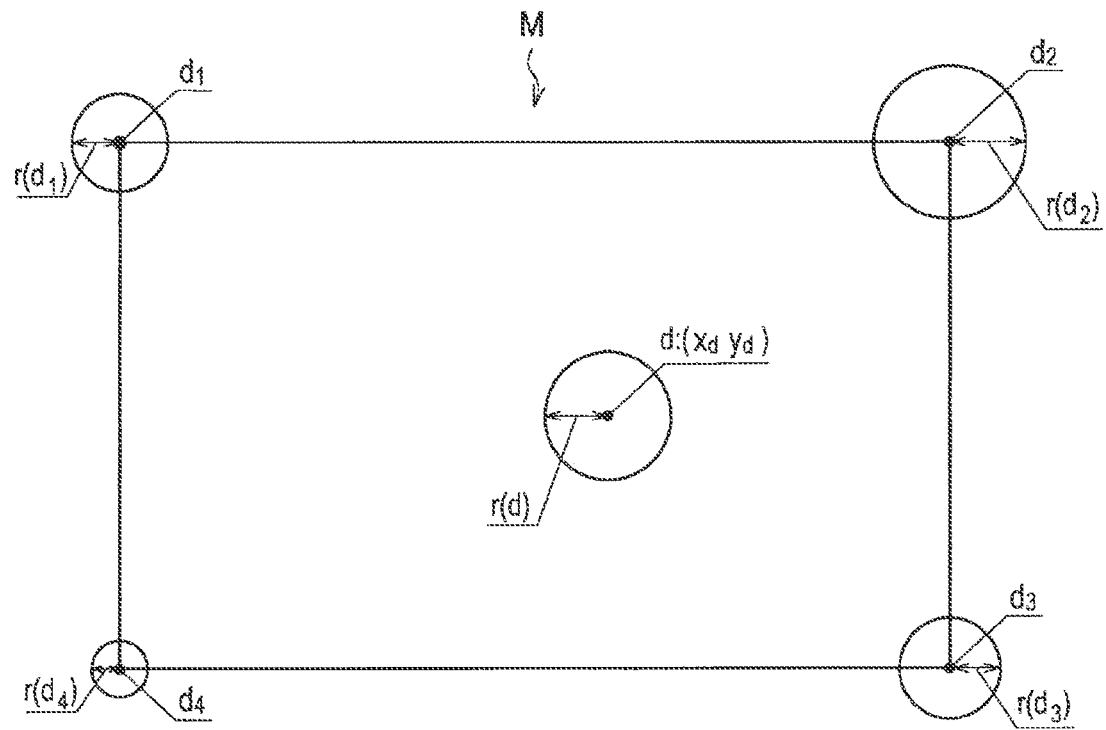
FIG. 6 is a diagram for explaining an example of a map according to the present embodiment.

FIG. 6 is a diagram for explaining an example of the map M according to the present embodiment. As shown in FIG. 6, r(d) represents the radius of the light-emitting circle appearing in a captured image in a case where the digital pen 50 is located at a position d on the calibration plane S. The map generation unit 43 calculates the radius r(d) of the light-emitting circle at any coordinate point $(x_d, y_d)$ in a captured image on the basis of the radii $r(d_1)$ to $r(d_4)$ of the light-emitting circles appearing in the captured image in a case where the digital pen 50 is located at the vertices $d_1$ to $d_4$ of a projected image. As a result, the map M defining the radius r(d) of the light-emitting circle at any coordinate point $(x_d, y_d)$ in a captured image is generated.

(3) Process Flow

Figure 7:
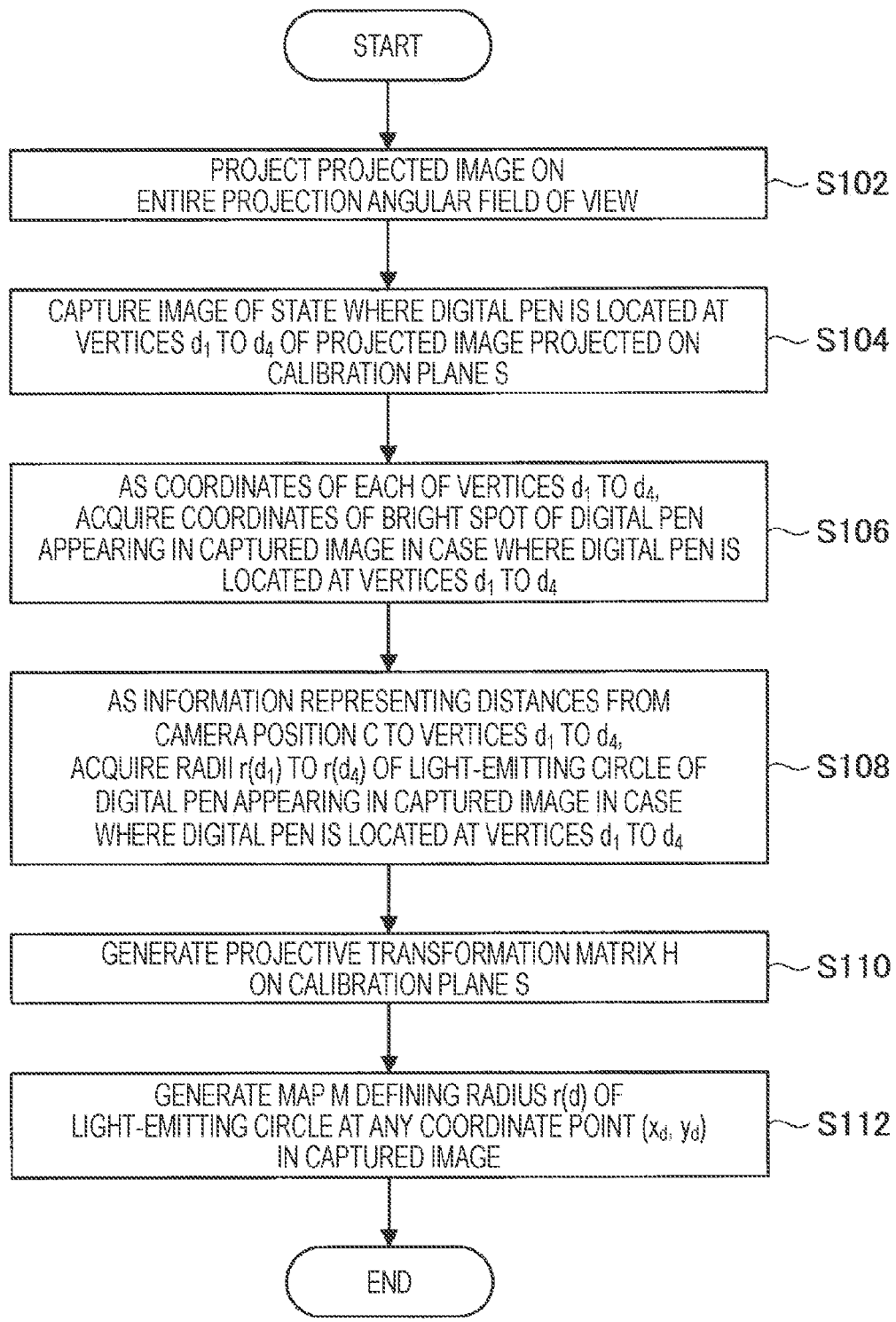
FIG. 7 is a flowchart showing an example flow of a preliminary process performed by the drawing system according to the present embodiment.

FIG. 7 is a flowchart showing an example flow of the preliminary process performed by the drawing system 1 according to the present embodiment. As shown in FIG. 7, first, the projection unit 20 projects a projected image on the entire projection angular field of view 21 (step S102). Then, the imaging unit 10 captures an image of the state where the digital pen 50 is located at the vertices $d_1$ to $d_4$ of the projected image projected on the calibration plane S (S104). In this step, when a vertex of the projected image exists in the air as described above with reference to FIG. 5, the auxiliary board 61 is used to project the vertex of the projected image on the calibration plane S. Next, the position acquisition unit 41 acquires, as the coordinates of each of the vertices $d_1$ to $d_4$, the coordinates of each of the bright spots of the digital pens 50 appearing in the captured image in a case where the digital pen 50 is located at the vertices $d_1$ to $d_4$ (S106). Then, the position acquisition unit 41 acquires, as the information representing the distances from the camera position C to the vertices $d_1$ to $d_4$, the radii $r(d_1)$ to $r(d_4)$ of the light-emitting circles of the digital pen 50 in a case where the digital pen 50 is located at the vertices $d_1$ to $d_4$ (step S108). Next, the calibration unit 42 generates a projective transformation matrix H on the calibration plane S on the basis of the coordinates of each of the vertices $d_1$ to $d_4$ in the captured image (step S106). Then, the map generation unit 43 generates the map M defining the radius r(d) of the light-emitting circle at any coordinate point $(x_d, y_d)$ in a captured image, on the basis of the coordinates of each of the vertices $d_1$ to $d_4$ and the radii $r(d_1)$ to $r(d_4)$ of the light-emitting circles in the captured image (step S108).

<3.3. Projection Control>

The output control unit 44 controls projection of drawing information on the basis of the position of the digital pen 50 (that is, the coordinates in a captured image and the distance from the camera position C), the projective transformation matrix H, and the map M. Specifically, the output control unit 44 controls projection of the drawing information performed by the projection unit 20 on the basis of the coordinates of the digital pen 50 on the drawing surface S' (for example, the coordinates of the digital pen 50 in a captured image). Moreover, the output control unit 44 controls the projection of the drawing information performed by the projection unit 20 on the basis of the ratio information between a first distance and a second distance, the first distance being from the reference point to the digital pen 50, and the second distance being from the reference point to the intersection point between the straight line connecting the reference point with the digital pen 50 and the calibration plane S. The coordinates and the ratio information regarding the digital pen 50 on the drawing surface S' can be acquired from the sensing information regarding the digital pen 50. The sensing information regarding the digital pen 50 herein refers to the sensing information regarding the digital pen 50 that is in drawing operation on the drawing surface S'.

In the examples illustrated in FIGS. 1 to 3, the first distance is the distance from the camera position C to the position d' of the digital pen 50 on the drawing surface S'. The first distance can also be regarded as the distance from the camera position C to the position of the digital pen 50 in drawing operation. The first distance is acquired by the position acquisition unit 41. The first distance is acquired on the basis of, for example, the radius r(d') of the light-emitting circle of the digital pen 50 appearing in a captured image.

In the examples illustrated in FIGS. 1 to 3, the second distance is the distance from the camera position C to the position d of the intersection point between the straight line connecting the camera position C with the position d' of the digital pen 50 and the calibration plane S. The second distance is acquired with reference to the map M. Specifically, the output control unit 44 acquires, as the second distance, the distance defined in the map M with respect to the coordinates $(x_d, y_d)$ corresponding to the coordinates $(x_{d'}, y_{d'})$ of the digital pen 50 included in a captured image. In other words, the output control unit 44 acquires, as the second distance, the distance indicated by the radius r(d) of the light-emitting circle that is expected to appear in a captured image if the digital pen 50 is located at the position d on the calibration plane S. Note that $(x_d, y_d)=(x_{d'}, y_{d'})$ is satisfied.

The ratio information between the first distance and the second distance may be acquired on the basis of the ratio between the first distance and the second distance. For example, the output control unit 44 controls the projection of drawing information performed by the projection unit 20 on the basis of the ratio between the first distance and the second distance. In the examples illustrated in FIGS. 1 to 3, for example, assuming that the distance from the camera position C to the position d illustrated in FIG. 3 is 1, the ratio between the first distance and the second distance is given as a distance a from the camera position C to the position d'. The ratio a may be regarded as the ratio between r(d) and r(d') and calculated in accordance with the mathematical expression (5):

$$a = r(d)/r(d') \qquad (5)$$

where a>1. Note that the ratio information between the first distance and the second distance may be acquired on the basis of, for example, the difference between the first distance and the second distance.

The output control unit 44 controls the coordinates of the drawing information in a projected image projected by the projection unit 20. Specifically, first, the output control unit 44 calculates a projective transformation matrix H' at the position d' on the drawing surface S' on the basis of the ratio a between the first distance and the second distance. Then, the output control unit 44 controls the coordinates of the drawing information in the projected image by using the corrected projective transformation matrix H' and the coordinates $(x_{d'}, y_{d'})$ of the digital pen 50 in a captured image. That is, the output control unit 44 converts the coordinates of the position d' in the captured image into the coordinates in the projected image by using the corrected projective transformation matrix H', places the drawing information at the converted coordinates in the projected image, and causes the projection unit 20 to project the drawing information. Note that the corrected projective transformation matrix H' is calculated in accordance with the mathematical expression (6).

$$H' = aH \qquad (6)$$

As described above, the projective transformation matrix H obtained during calibration is not used as it is, but the corrected projective transformation matrix H', which has been corrected in accordance with the distance difference between the first distance and the second distance with respect to the position d', is used. As a result, suppressing the occurrence of a mismatch between the position d' of the digital pen 50 on the drawing surface S' and the position of the drawing information projected on the drawing surface S' can be achieved.

Process Flow

Figure 8:
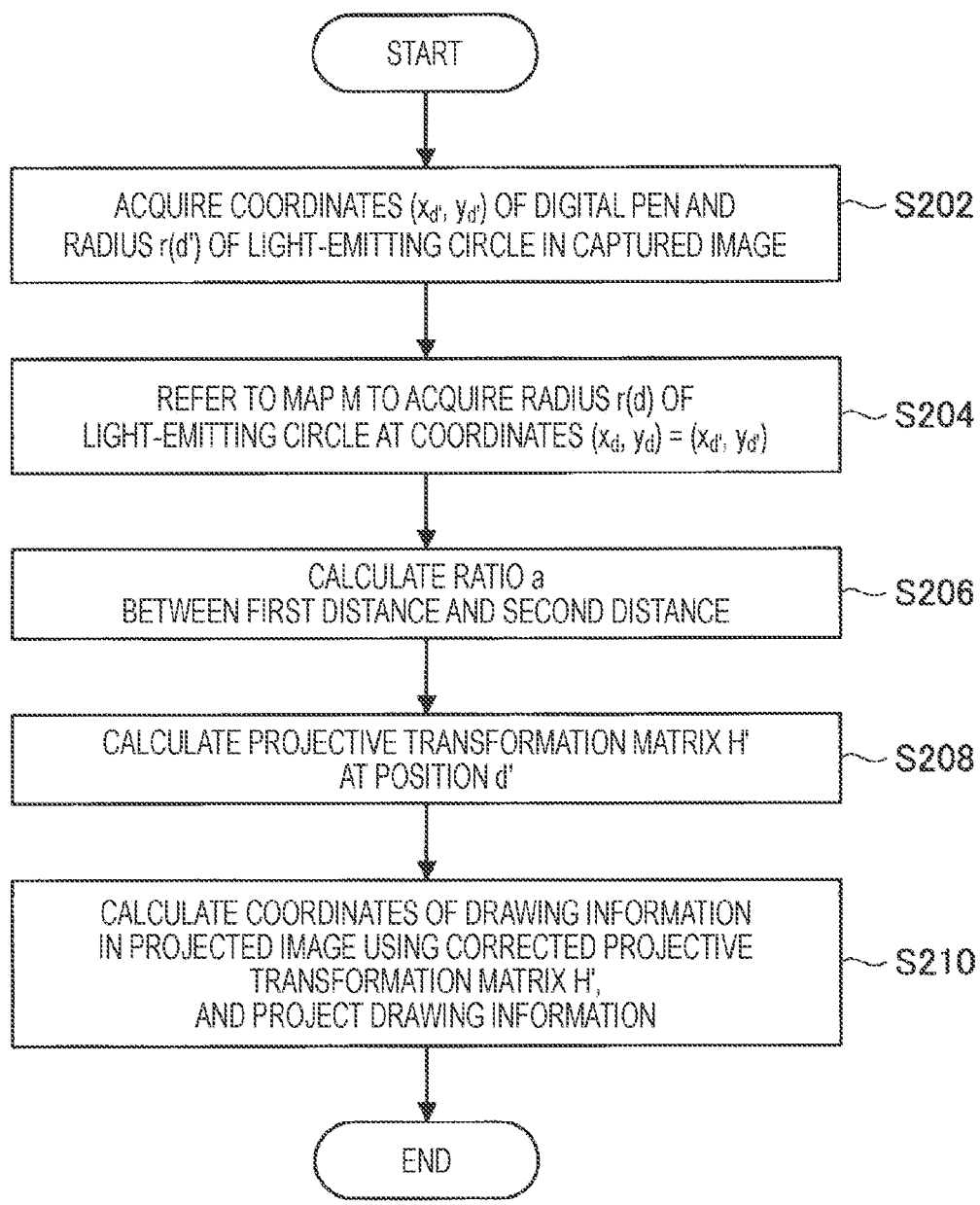
FIG. 8 is a flowchart showing an example flow of a projection control process performed by the drawing system according to the present embodiment.

With reference to FIG. 8, the following describes an example of a flow of the projection control process described above.

FIG. 8 is a flowchart showing an example flow of the projection control process performed by the drawing system 1 according to the present embodiment. As shown in FIG. 8, first, the position acquisition unit 41 acquires the coordinates $(x_{d'}, y_{d'})$ of the digital pen 50 and the radius r(d') of the light-emitting circle in a captured image on the basis of the captured image of the digital pen 50 on the drawing surface S' (step S202). Then, the output control unit 44 refers to the map M to acquire the radius r(d) of the light-emitting circle at the coordinates $(x_d, y_d)=(x_{d'}, y_{d'})$ (step S204). Next, the output control unit 44 calculates the ratio a between the first distance and the second distance in accordance with the mathematical expression (5) above (step S206). Then, the output control unit 44 calculates a projective transformation matrix H' at the position d' in accordance with the mathematical expression (6) above (step S208). Then, the output control unit 44 calculates the coordinates of the drawing information in a projected image by using the corrected projective transformation matrix H', and causes the projection unit 20 to project the drawing information (step S210).

Note that the projection control process shown in FIG. 8 may be repeatedly performed during a time period after the bright spot of the digital pen 50 appears in the imaging angular field of view 11 until the bright spot disappears therefrom.

Supplementary Information

Note that the foregoing has described projection control performed in a case where the drawing surface S' is farther from the camera position C than the calibration plane S. The following describes projection control performed in a case where the drawing surface S' is closer to the camera position C than the calibration plane S with reference to FIGS. 9 and 10.

Figure 9:
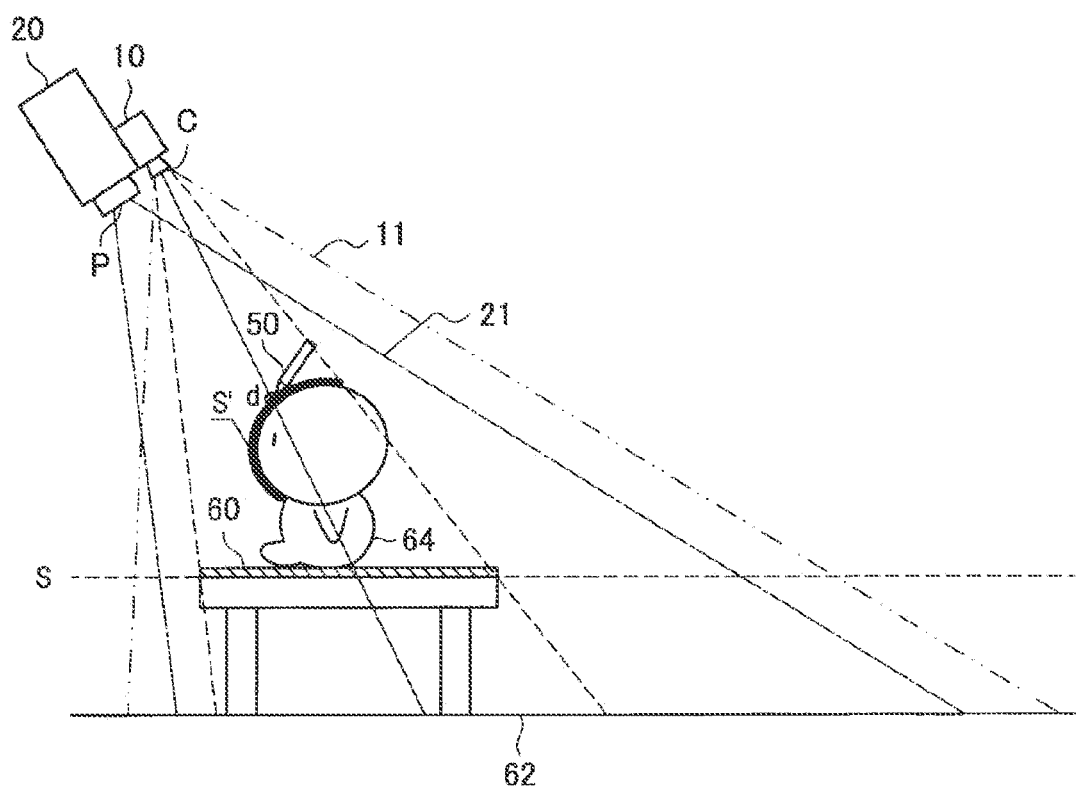
FIG. 9 is a diagram for explaining an example use of the drawing system according to the present embodiment.
Figure 10:
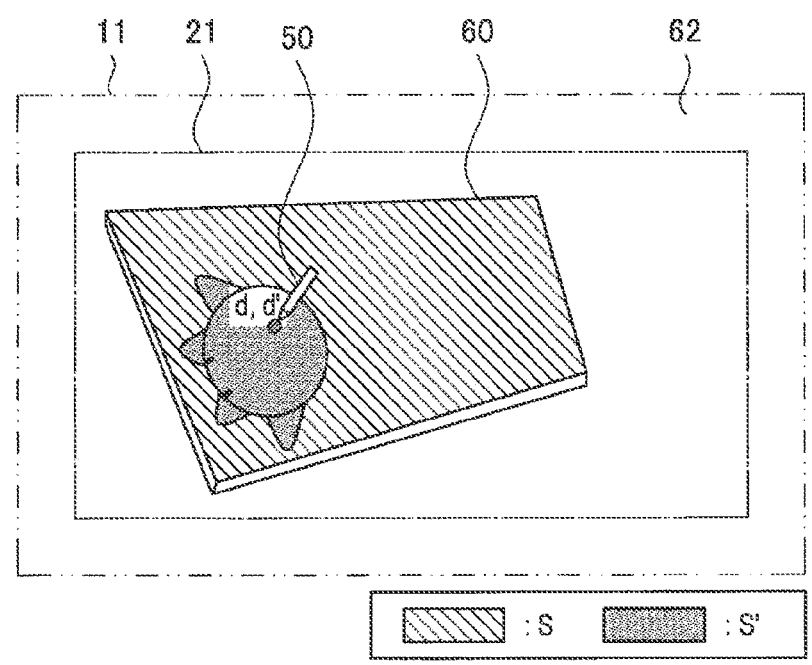
FIG. 10 is a diagram illustrating an example of a captured image captured by the imaging unit in the state illustrated in FIG. 9.

FIG. 9 is a diagram for explaining an example use of the drawing system 1 according to the present embodiment. FIG. 10 is a diagram illustrating an example of a captured image captured by the imaging unit 10 in the state illustrated in FIG. 9. As illustrated in FIG. 9, a doll 64 is placed on the tabletop surface 60, and a surface of the doll 64 serves as the drawing surface S'. In this case, a captured image shown in FIG. 10 is obtained.

The projection control performed in a case where the drawing surface S' is closer to the camera position than the calibration plane S is similar to the projection control performed in a case where the drawing surface S' is farther from the camera position than the calibration plane S. Note that, however, the ratio a calculated in accordance with the mathematical expression (5) above satisfies 0<a<1.

Furthermore, as illustrated in FIG. 9, the surface of the doll 64 is curved. The drawing surface S' may be a surface of a three-dimensional object in any shape having a curved surface and the like. However, the above-described algorithm assumes that the calibration plane S and the drawing surface S' are parallel. For this reason, in a case where the drawing surface S' is curved, the area of the position d' of the digital pen 50 in the drawing surface S' is segmentalized so that the area is regarded as parallel to the calibration plane S, and then the above-described algorithm is applied.

4. MODIFICATIONS

<4.1. First Modification>

A first modification is an example in which the output control unit 44 controls not only the coordinates as described above but also other items of the drawing information in a projected image.

Controlling Size of Drawing Information

The output control unit 44 may control the size of the drawing information in a projected image projected by the projection unit 20. Specifically, the output control unit 44 controls the size of the drawing information on the basis of the ratio a between the first distance and the second distance. The size of the drawing information is, for example, the thickness of a line drawn in accordance with the trail of the digital pen 50. For example, the output control unit 44 performs control to make the line thickness uniform. This matter is explained below with reference to FIG. 11.

Figure 11:
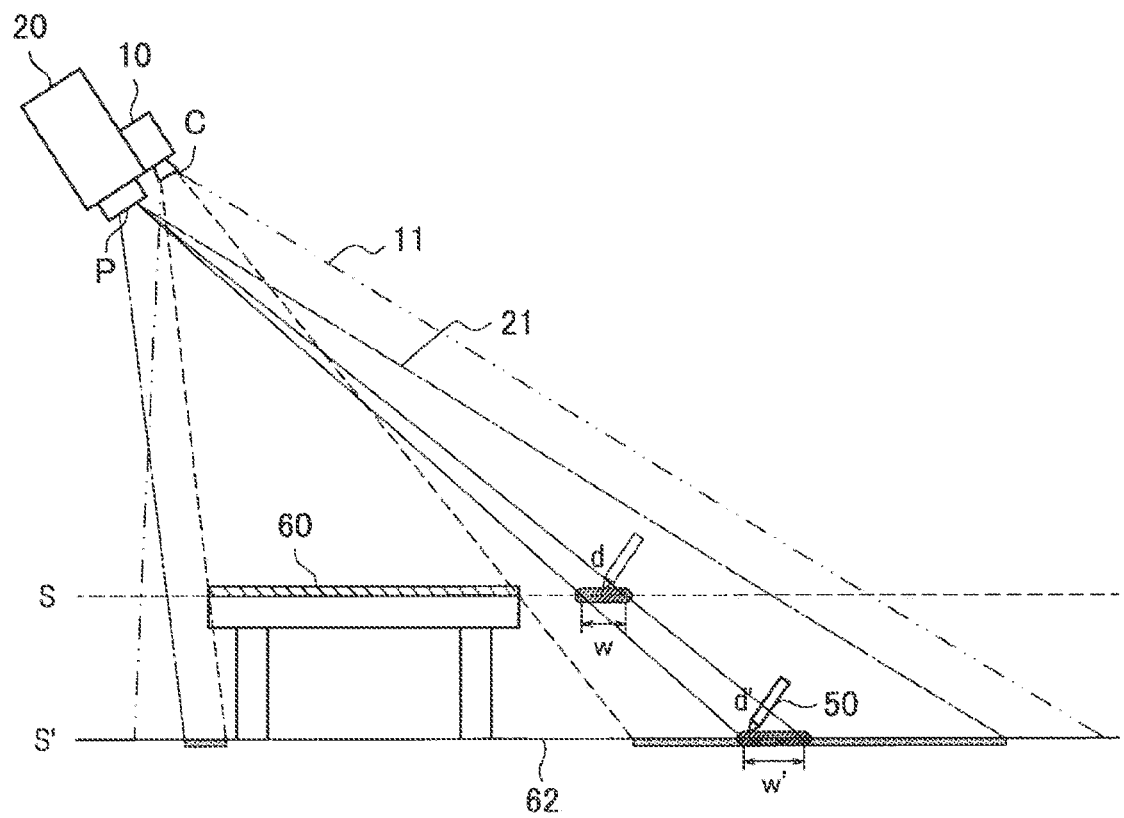
FIG. 11 is a diagram for explaining an example of projection control by a drawing system according to a first modification.

FIG. 11 is a diagram for explaining an example of projection control by the drawing system 1 according to the first modification. As illustrated in FIG. 11, in a case where the digital pen 50 is located at the position d on the calibration plane S, the apparent size (for example, in units of meters) of the drawing information projected on the calibration plane S is represented by W. In addition, the size of the drawing information in terms of data (for example, in units of pixels) having the size W projected in a projected image on the calibration plane S is represented by $b_d$. Furthermore, as illustrated in FIG. 11, in a case where the digital pen 50 is located at the position d' on the drawing surface S', the apparent size of the drawing information projected on the drawing surface S' is represented by W'. In addition, the size of the drawing information in terms of data having the size W' projected in a projected image on the drawing surface S' is represented by $b_{d'}$. If $b_{d'}=b_d$ is satisfied, W'=aW is established. Then, the output control unit 44 controls the size $b_{d'}$ of the drawing information in terms of data in accordance with the mathematical expression (7).

$$b_{d'}=b_d/a \qquad (7)$$

As a result, it is made possible to make the apparent thickness of a line drawn in accordance with the trail of the digital pen 50 uniform regardless of the distance between the camera position C and the digital pen 50.

Controlling Brightness of Drawing Information

The output control unit 44 may control the brightness of the drawing information in a projected image projected by the projection unit 20. Specifically, the output control unit 44 controls the brightness of the drawing information on the basis of the ratio a between the first distance and the second distance. The brightness of the projected drawing information in terms of data in a case where the digital pen 50 is located at the position d on the calibration plane S is represented by v, and the brightness of the projected drawing information in terms of data in a case where the digital pen 50 is located at the position d' on the drawing surface S' is represented by v'. As a precondition, the apparent brightness of the projected drawing information is reduced in proportion to the distance from the projection unit 20. Then, the output control unit 44 controls the brightness $v_{d'}$ of the drawing information in terms of data in accordance with the mathematical expression (8) using a coefficient e that is calculated on the basis of the ratio a.

$$v_{d'}=e\times v_d \qquad (8)$$

As a result, it is made possible to make the apparent brightness of a line drawn in accordance with the trail of the digital pen 50 uniform regardless of the distance between the camera position C and the digital pen 50.

Controlling Color of Drawing Information

The output control unit 44 may control the color of the drawing information in a projected image projected by the projection unit 20. Specifically, the output control unit 44 controls the color of the drawing information on the basis of the ratio a between the first distance and the second distance. For example, the apparent color saturation of the projected drawing information is reduced in proportion to the distance from the projection unit 20. Thus, the output control unit 44 uses a coefficient that is calculated on the basis of the ratio a to control the color saturation of the drawing information in terms of data, as with the brightness control in accordance with the mathematical expression (8) above.

As a result, it is made possible to make the apparent color saturation of a line drawn in accordance with the trail of the digital pen 50 uniform regardless of the distance between the camera position C and the digital pen 50.

Combination

The number of control items is not limited to one, and thus the output control unit 44 may simultaneously control two or more of the coordinates, the size, the brightness, and the color of the drawing information in a projected image.

<4.2. Second Modification>

A second modification is an example in which the distance from the reference point to the digital pen 50 is acquired on the basis of a result of distance measurement by a distance measuring sensor.

Figure 12:
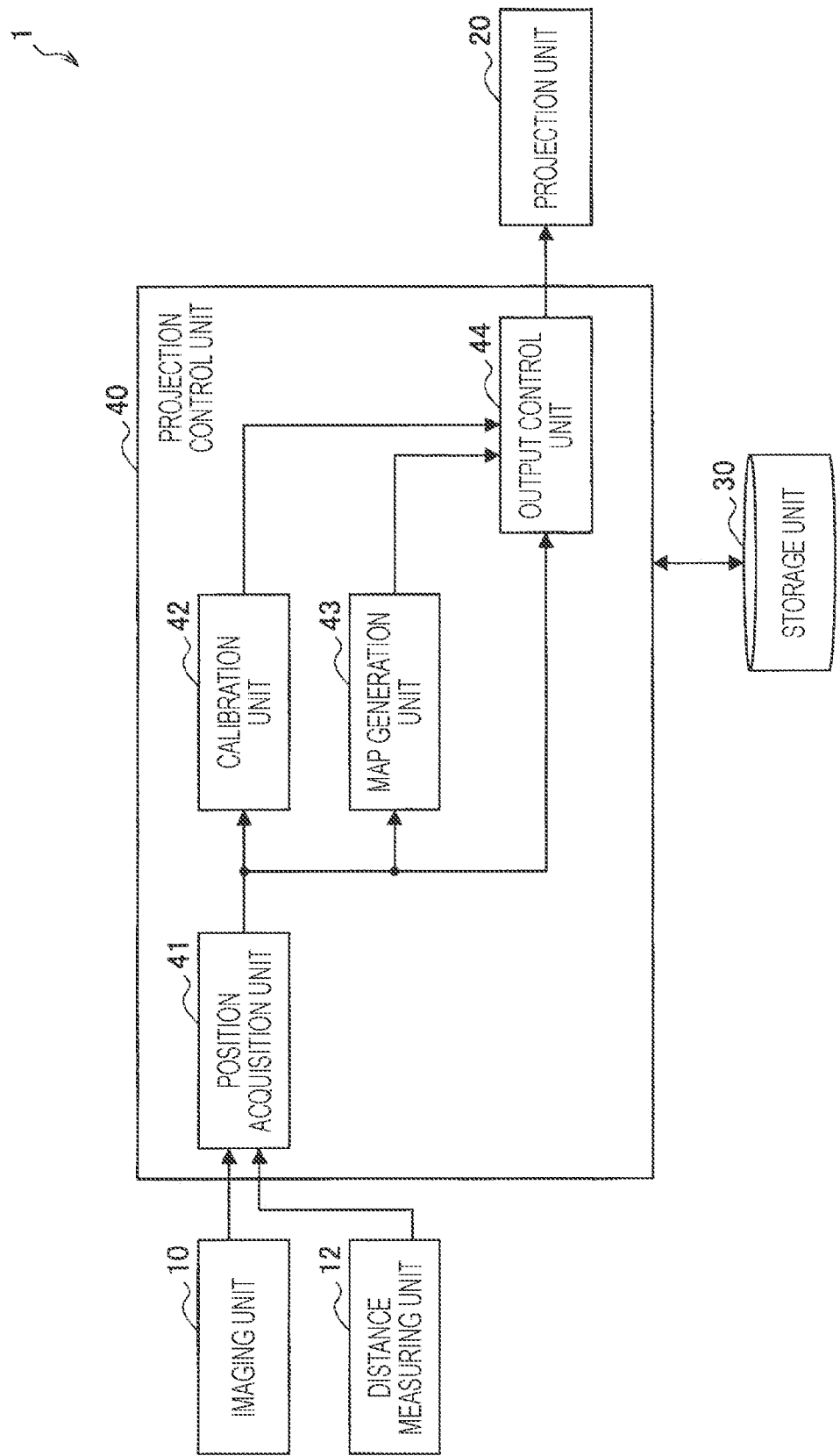
FIG. 12 is a block diagram illustrating an example of a functional configuration of a drawing system according to a second modification.

FIG. 12 is a block diagram illustrating an example of a functional configuration of a drawing system 1 according to the second modification. As illustrated in FIG. 12, the drawing system 1 according to the present modification further includes a distance measuring unit 12, in addition to the functional configuration illustrated in FIG. 3. The following describes the distance measuring unit 12 and functions of the other components characteristic of the present modification.

The distance measuring unit 12 is a sensor device that senses the distance to the target object. For example, the present distance measuring unit 12 senses the distance to the digital pen 50 and outputs the sensing information (that is, the distance information) obtained as a result of the sensing to the position acquisition unit 41. The distance measuring unit 12 may be implemented by, for example, an ultrasonic distance measuring sensor, a time-of-flight (ToF) type image sensor, a stereo camera, or the like.

The position acquisition unit 41 acquires the distance from the camera position C to the digital pen 50 on the basis of the sensing information provided by the distance measuring unit 12. A calibration between the imaging unit 10 and the distance measuring unit 12 is preferably performed in advance. The map M is generated on the basis of the distance to the digital pen 50 as provided by the distance measuring unit 12 in a case where the digital pen 50 is located at a plurality of points on the calibration plane S. The plurality of points used for generating the map M may be a plurality of known points used for the calibration. In this case, a calibration is performed on the basis of the coordinates of the digital pen 50 in a captured image in a case where the digital pen 50 is located at vertices $d_1$ to $d_4$ of a projected image, and the map M is generated on the basis of the distance information obtained by the distance measuring unit 12.

Note here that, when the map M is generated on the basis of the distance information obtained by the distance measuring unit 12, the distance defined in the map M is an actual distance. The map M defines the actual distance from the camera position C to the digital pen 50 in a case where the digital pen 50 is located at a position on the calibration plane S corresponding to each coordinate point in a captured image.

The projection control by the output control unit 44 according to the present modification is basically similar to the projection control on the basis of the radius of a light-emitting circle described above. However, the first distance is sensed as an actual value by the distance measuring unit 12.

Note that the projective transformation matrix H and the map M may be preset as long as the positional relationship among the imaging unit 10, the projection unit 20, the distance measuring unit 12, and the calibration plane S is fixed. In this case, calibration and generation of the map M are omitted.

<4.3. Third Modification>

A third modification is an example in which the projection control is performed by using a three-dimensional position of the digital pen 50 instead of a captured image of the digital pen 50.

(1) Example Configuration

Figure 13:
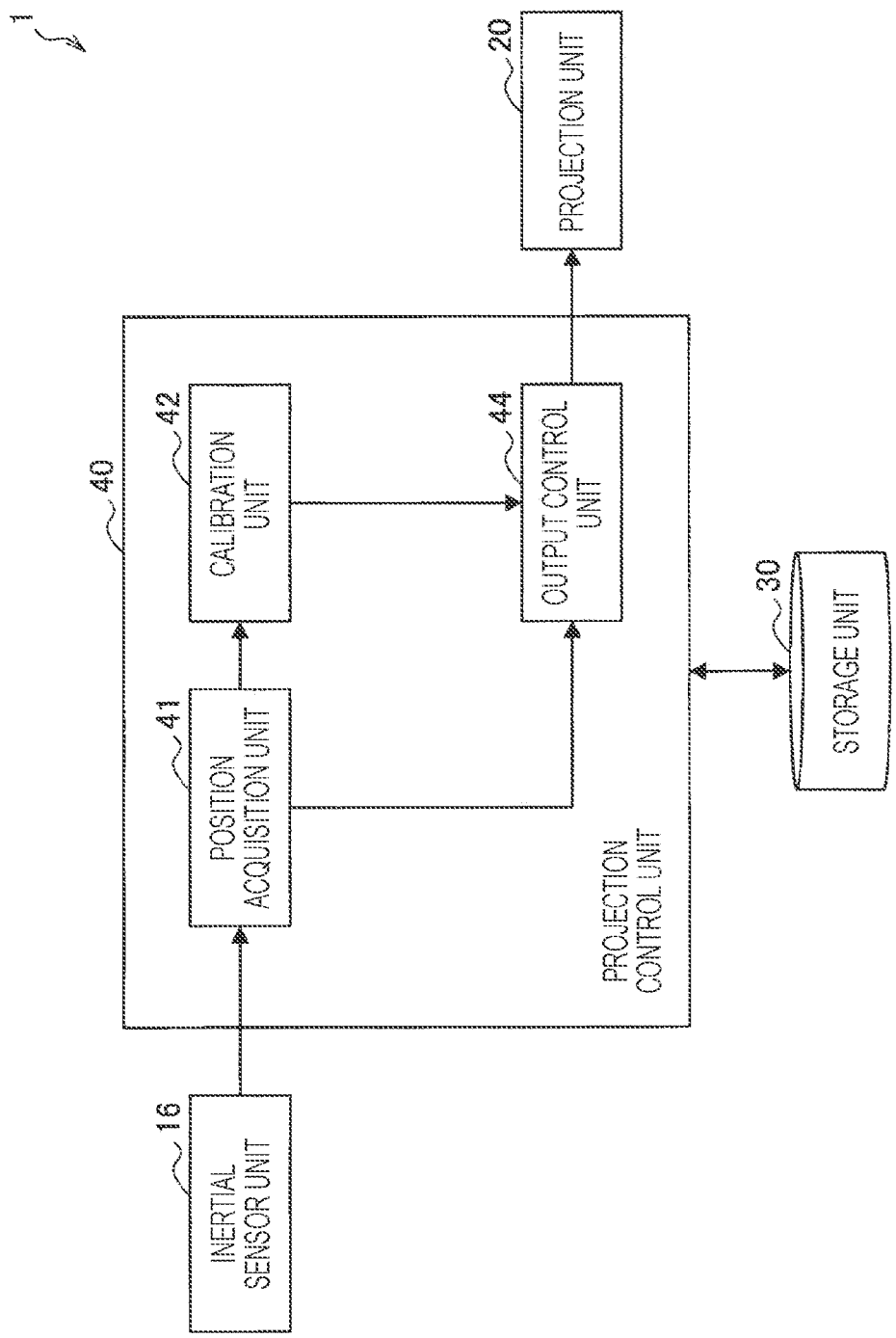
FIG. 13 is a block diagram illustrating an example of a functional configuration of a drawing system according to a third modification.

FIG. 13 is a block diagram illustrating an example of a functional configuration of a drawing system 1 according to the third modification. As illustrated in FIG. 13, the drawing system 1 according to the present modification includes an inertial sensor unit 16, the projection unit 20, the storage unit 30, and the projection control unit 40. In addition, the projection control unit 40 includes the position acquisition unit 41, the calibration unit 42, and the output control unit 44.

The inertial sensor unit 16 senses inertial information regarding the digital pen 50. The inertial sensor unit 16, which includes an acceleration sensor and a gyro sensor, is mounted on the digital pen 50. The inertial sensor unit 16 senses the acceleration and the angular velocity of the digital pen 50, and transmits the sensed acceleration and angular velocity to the position acquisition unit 41.

Figure 14:
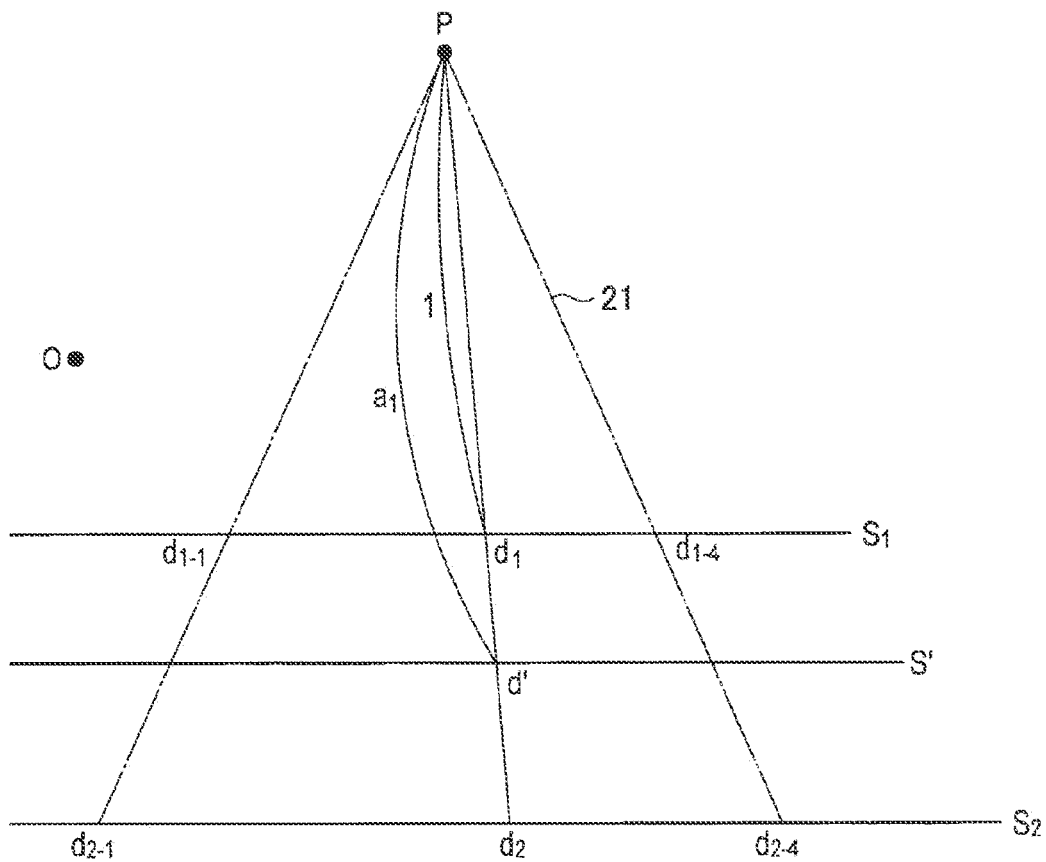
FIG. 14 is a diagram schematically showing a positional relationship among elements involved in the third modification.

The following describes technical features of the present modification with reference to FIG. 14. FIG. 14 is a diagram schematically showing a positional relationship among elements involved in the third modification.

(2) Acquiring Position of Digital Pen 50

The position acquisition unit 41 acquires the position of the digital pen 50 on the basis of sensing information regarding the digital pen 50. The sensing information here refers to the acceleration and the angular velocity obtained by the inertial sensor unit. The position acquisition unit 41 acquires the three-dimensional position of the digital pen 50 through calculation by an inertial navigation system (IMS). Note that, however, the three-dimensional position acquired here is a relative three-dimensional position with respect to any certain reset origin O shown in FIG. 13.

(3) Calibration

In the present modification, the calibration is performed by using two calibration planes: a first calibration plane $S_1$ and a second calibration plane $S_2$. For example, the first calibration plane $S_1$ is the tabletop surface 60 illustrated in FIG. 1, the second calibration plane $S_2$ is the floor surface 62 illustrated in FIG. 1, and the drawing surface S' is a surface of any other real object. The reference point in the present modification is the projector position P.

The calibration unit 42 acquires the three-dimensional position of the digital pen 50 in a case where the digital pen 50 is located at a plurality of known points on each of projected images projected on the first calibration plane $S_1$ and the second calibration plane $S_2$. For example, the calibration unit 42 acquires the three-dimensional positions of the plurality of known points in a projected image projected on the first calibration plane $S_1$. Such three-dimensional positions are acquired by the position acquisition unit 41 on the basis of, for example, the inertial information provided in a case where the digital pen 50 is located at the plurality of known points. The plurality of known points is, for example, vertices $d_{1-1}$ to $d_{1-4}$ of a projected image. Similarly, the calibration unit 42 acquires the three-dimensional positions of the plurality of known points in a projected image projected on the second calibration plane $S_2$. Such three-dimensional positions are acquired by the position acquisition unit 41 on the basis of, for example, the inertial information provided in a case where the digital pen 50 is located at the plurality of known points. The plurality of known points is, for example, vertices $d_{2-1}$ to $d_{2-4}$ of a projected image.

Then, the calibration unit 42 generates a projective transformation matrix for converting the acquired three-dimensional position on the first calibration plane $S_1$ or the second calibration plane $S_2$ into the coordinates in a projected image projected by the projection unit 20. Specifically, first, the calibration unit 42 geometrically calculates the projector position P on the basis of the acquired three-dimensional positions of the vertices $d_{1-1}$ to $d_{1-4}$ and the acquired three-dimensional positions of the vertices $d_{2-1}$ to $d_{2-4}$. Then, the calibration unit 42 calculates a projective transformation matrix $H_1$ with regard to the first calibration plane $S_1$ on the basis of the projector position P and the three-dimensional positions of the vertices $d_{1-1}$ to $d_{1-4}$. Alternatively, the calibration unit 42 calculates a projective transformation matrix $H_2$ with regard to the second calibration plane $S_2$ on the basis of the projector position P and the three-dimensional positions of the vertices $d_{2-1}$ to $d_{2-4}$.

(4) Projection Control

The output control unit 44 controls projection of the drawing information by the projection unit 20, on the basis of the three-dimensional position of the digital pen 50 in a case where the digital pen 50 is located at a plurality of known points on each of projected images projected on the first calibration plane $S_1$ and the second calibration plane $S_2$ and on the basis of the three-dimensional position of the digital pen 50 in drawing operation. Specifically, the output control unit 44 controls projection of the drawing information performed by the projection unit 20, on the basis of the projective transformation matrix H obtained through calibration and the three-dimensional position of the digital pen 50 in drawing operation.

Let d' be the three-dimensional position of the digital pen 50 in drawing operation. In addition, let position $d_1$ be the position of the intersection point between the straight line that connects the projector position P with the position d' of the digital pen 50 and the first calibration plane $S_1$. Furthermore, let position $d_2$ be the position of the intersection point between the straight line that connects the projector position P with the position d' of the digital pen 50 and the second calibration plane $S_2$.

First, the output control unit 44 calculates a ratio $a_1$ or a ratio $a_2$ between the distance from the projector position P to the position d' of the digital pen 50 and the distance from the projector position P to the position $d_1$ or the position $d_2$. For example, as illustrated in FIG. 14, assuming that the distance from the projector position P to the position $d_1$ is 1, the ratio $a_1$ between the first distance and the second distance with regard to the first calibration plane $S_1$ is given as a distance $a_1$ from the projector position P to the position d'. On the other hand, although not illustrated in FIG. 14, assuming that the distance from the projector position P to the position $d_2$ is 1, the ratio $a_2$ between the first distance and the second distance with regard to the second calibration plane $S_2$ is given as a distance $a_2$ from the projector position P to the position d'.

Then, the output control unit 44 calculates a corrected projective transformation matrix $H_1'$ or $H_2'$ in accordance with the mathematical expression (6) above, converts the position d' into the coordinates in a projected image using the corrected projective transformation matrix $H_1'$ or $H_2'$, places the drawing information at the converted coordinates in the projected image, and causes the projection unit 20 to project the drawing information. As a result, suppressing the occurrence of a mismatch between the position d' of the digital pen 50 on the drawing surface S' and the position of the drawing information projected on the drawing surface S' can be achieved as in the embodiment above.

<4.4. Fourth Modification>

The above embodiment assumes that the camera position C and the projector position P coincide and the optical axes thereof also coincide. In contrast, the present modification is an example in which the occurrence of a mismatch between the position d' of the digital pen 50 on the drawing surface S' and the position of drawing information projected on the drawing surface S' is suppressed even when the camera position C and the projector position P differ from each other and/or the optical axes of the imaging unit 10 and the projection unit 20 differ from each other. Note that the present modification assumes that the reference point is the camera position C, as an example.

(1) Overview

Figure 15:
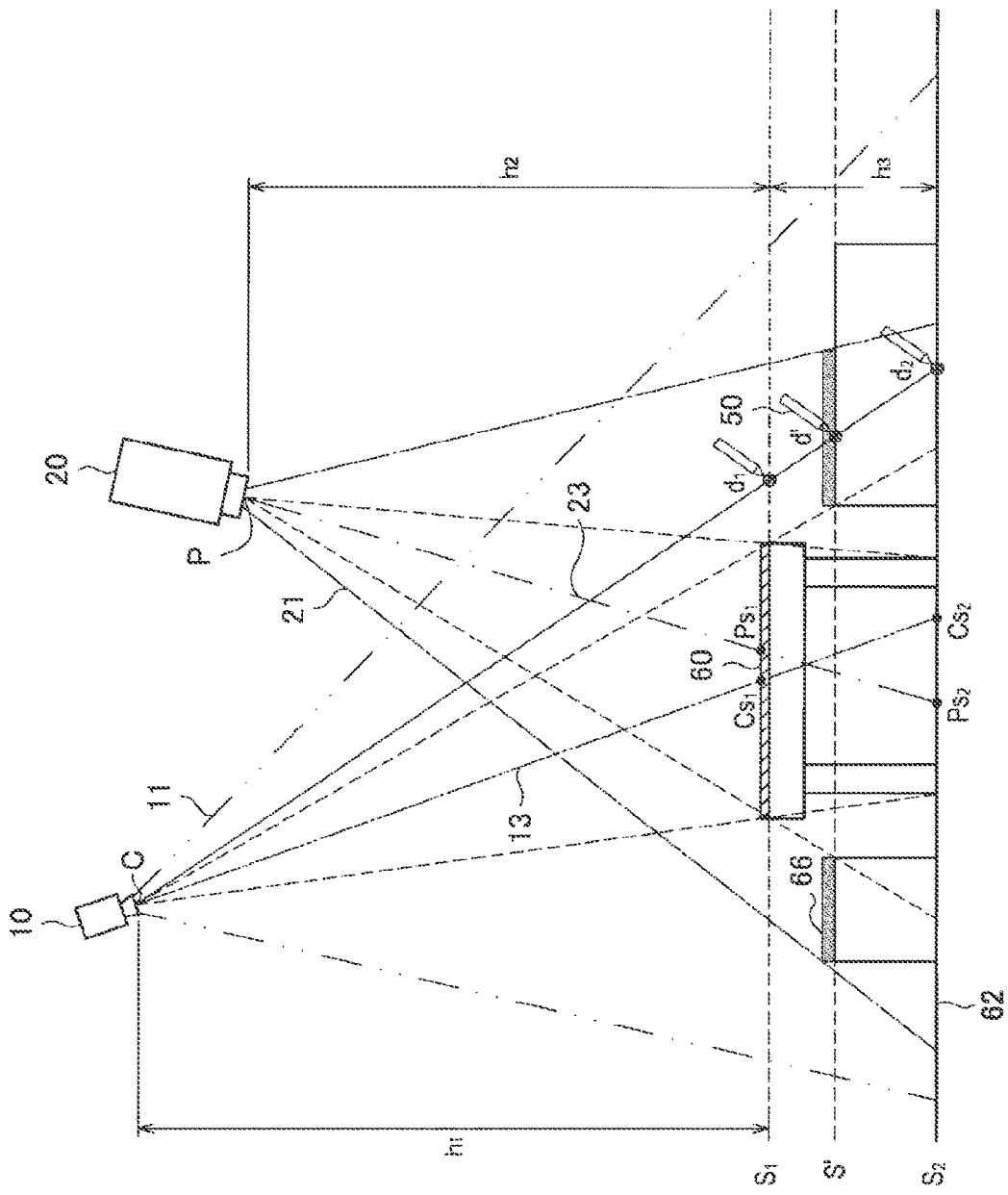
FIG. 15 is a diagram for providing an overview of a drawing system according to a fourth modification.

FIG. 15 is a diagram for providing an overview of a drawing system 1 according to the fourth modification. As shown in FIG. 15, in the present modification, the camera position C and the projector position P differ from each other, and the optical axes of the imaging unit 10 and the projection unit 20 differ from each other. In the present modification, the calibration is performed on two calibration planes: a first calibration plane $S_1$ and a second calibration plane $S_2$ (corresponding to another calibration plane). In the example illustrated in FIG. 15, the first calibration plane $S_1$ is the tabletop surface 60, the second calibration plane $S_2$ is the floor surface 62. Furthermore, the drawing surface S' is a surface of any other real object and, in the example in FIG. 15, the drawing surface S' is a bench seat surface 66. Note that it is assumed that the first calibration plane $S_1$, the second calibration plane $S_2$, and the drawing surface S' are all parallel to one another. The distance between the camera position C and the first calibration plane $S_1$ is represented by $h_1$, the distance between the projector position P and the first calibration plane $S_1$ is represented by $h_2$, and the distance between the first calibration plane $S_1$ and the second calibration plane $S_2$ is represented by $h_3$.

In the example illustrated in FIG. 15, it is assumed that the digital pen 50 is located at a position d' on the drawing surface S'. In addition, the intersection point between the straight line that connects the camera position C with the position d' of the digital pen 50 and the first calibration plane $S_1$ is denoted as a position $d_1$. In addition, the intersection point between the straight line that connects the camera position C with the position d' of the digital pen 50 and the second calibration plane $S_2$ is denoted as a position $d_2$. In this case, the coordinates of the digital pen 50 in a captured image are the same regardless of whether the digital pen 50 is located at the position $d_1$ on the first calibration plane $S_1$, or at the position $d_2$ on the calibration plane $S_2$, or at the position d' on the drawing surface S'.

The intersection point between an imaging optical axis 13, which is the optical axis of the imaging unit 10, and the first calibration plane $S_1$ is represented by $C_{s1}$, and the intersection point between the imaging optical axis 13 and the second calibration plane $S_2$ is represented by $C_{s2}$. Note that, for convenience of notation, $S_1$ to be indicated by a subscript is expressed as $s_1$. The same applies to $S_2$. These intersection points are center points in the imaging angular field of view 11. The intersection point between a projection optical axis 23, which is the optical axis of the projection unit 20, and the first calibration plane $S_1$ is represented by $P_{s1}$, and the intersection point between the projection optical axis 23 and the second calibration plane $S_2$ is represented by $P_{s2}$. These intersection points are center points in the projection angular field of view 21. The size relationship between these angular fields of view and the positional relationship between the centers of these angular fields of view are different between the first calibration plane $S_1$ and the second calibration plane $S_2$. This matter is explained below with reference to FIGS. 16 to 18.

Figure 16:
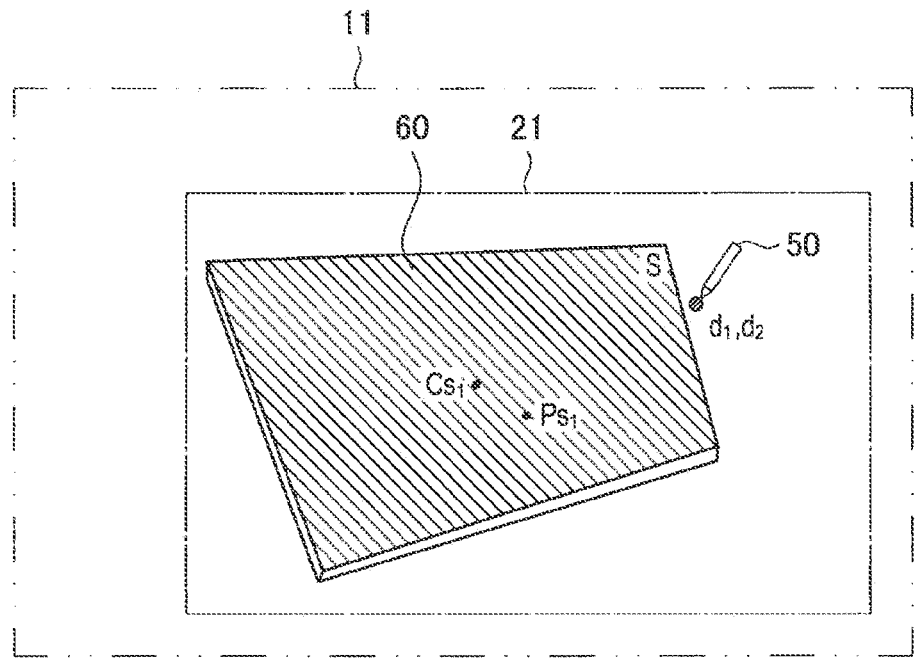
FIG. 16 is a diagram illustrating a positional relationship among angular fields of view and center points of angular fields of view on a first calibration plane illustrated in the example in FIG. 15.
Figure 17:
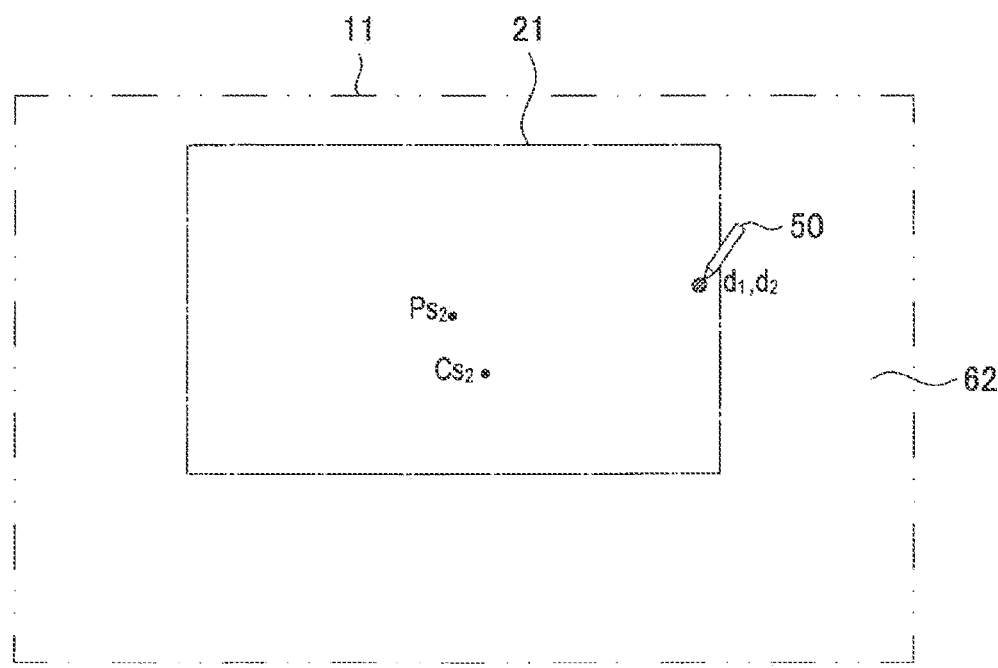
FIG. 17 is a diagram illustrating a positional relationship among angular fields of view and center points of angular fields of view on a second calibration plane illustrated in the example in FIG. 15.
Figure 18:
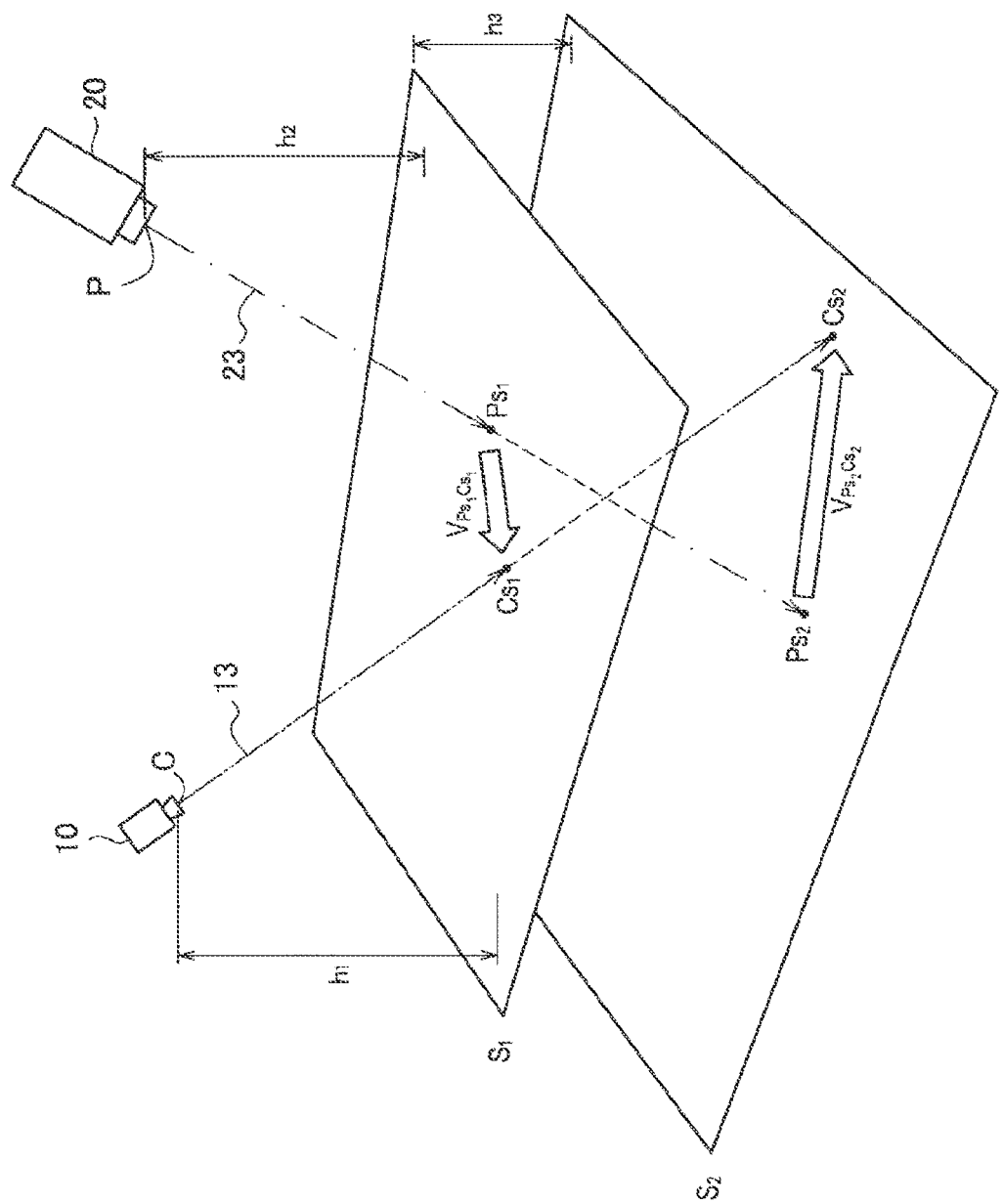
FIG. 18 is a diagram illustrating a relative positional relationship between center points of angular fields of view on each of the first calibration plane and the second calibration plane illustrated in the example in FIG. 15.

FIG. 16 is a diagram illustrating the angular fields of view and a positional relationship between center points of the angular fields of view on the first calibration plane $S_1$ illustrated in the example in FIG. 15. FIG. 17 is a diagram illustrating the angular fields of view and a positional relationship between center points of the angular fields of view on the second calibration plane $S_2$ illustrated in the example in FIG. 15. FIG. 18 is a diagram illustrating a relative positional relationship between center points of angular fields of view on each of the first calibration plane $S_1$ and the second calibration plane $S_2$ illustrated in the example in FIG. 15. Comparing FIG. 16 with FIG. 17, the position $d_1$ of the digital pen 50 on the first calibration plane $S_1$ matches the position $d_2$ of the digital pen 50 on the second calibration plane $S_2$. In addition, comparing FIG. 16 with FIG. 17, the size of the projection angular field of view 21 relative to the imaging angular field of view 11 is different between the first calibration plane $S_1$ and the second calibration plane $S_2$. On the other hand, comparing FIG. 16 with FIG. 17, the positional relationship between the center of the imaging angular field of view $C_{S1}$ and the center of the projection angular field of view $P_{s1}$ on the first calibration plane $S_1$ differs from the positional relationship between the center of the imaging angular field of view $C_{S2}$ and the center of the projection angular field of view $P_{s2}$ on the second calibration plane $S_2$. Therefore, as illustrated in FIG. 18, a two-dimensional vector $v\_P_{S1}C_{S1}$ indicating a physical mismatch between the center points of the angular fields of view on the first calibration plane $S_1$ differs from a two-dimensional vector $v\_P_{S2}C_{S2}$ indicating a physical mismatch between the center points of the angular fields of view on the second calibration plane $S_2$. Note that a combination of a reference character and a subscript is herein represented by a reference character, an underscore, and a subscript.

The role of the projective transformation matrix $H_1$ obtained through calibration on the first calibration plane $S_1$ is to achieve a coordinate transformation ensuring that the imaging angular field of view 11 fits into the projection angular field of view 21 on the first calibration plane $S_1$. However, as illustrated in FIGS. 16 to 18, both the size relationship between the imaging angular field of view 11 and the projection angular field of view 21 and the positional relationship between the center point of the imaging angular field of view 11 and the center point of the projection angular field of view 21 differ between the first calibration plane $S_1$ and the second calibration plane $S_2$. That is, as a result of a change in distance from the camera position C, the scaling relationship between the angular fields of view varies and, at the same time, the positional relationship between the centers of the imaging angular field of view and the projection angular field of view varies in translational movement. Therefore, on a plane other than the first calibration plane $S_1$, it is difficult to perform an appropriate coordinate transformation only with the projective transformation matrix $H_1$ and, furthermore, an algorithm reflecting the scaling component only as in the above-described embodiment leaves room for accuracy improvement.

Therefore, in the present modification, a translational movement component on the drawing surface S' with respect to the projective transformation matrix $H_1$ is estimated on the basis of the projective transformation matrix $H_1$ on the first calibration plane $S_1$ and the projective transformation matrix $H_2$ on the second calibration plane $S_2$. Furthermore, in the present modification, a scaling component on the drawing surface S' with respect to the projective transformation matrix $H_1$ is estimated by using a method similar to the method according to the embodiment described above. The translational movement component and the scaling component on the drawing surface S' with respect to the projective transformation matrix $H_1$ obtained as described above allow for an appropriate coordinate transformation on any drawing surface S'. That is, suppressing the occurrence of a mismatch between the position d' of the digital pen 50 on the drawing surface S' and the position of the drawing information projected on the drawing surface S' can be achieved.

Note that the projective transformation matrix includes a scaling component and a translational movement component ($=v\_P_{S1}C_{S1}$). The above embodiment assumes that the camera position C and the projector position P coincide and the optical axes thereof also coincide, and this assumption means that the translational movement component ($=v\_P_{S1}C_{S1}$) is zero.

(2) Example Configuration

An example configuration of the drawing system 1 according to the present modification is similar to the example configuration described with reference to FIG. 4.

(3) Technical Features

Calibration

The calibration unit 42 generates a projective transformation matrix $H_1$ related to the first calibration plane $S_1$. In addition, the calibration unit 42 generates a projective transformation matrix $H_2$ related to the second calibration plane $S_2$.

Generating Map $M_1$

The map generation unit 43 generates a map $M_1$ that defines, with regard to each coordinate point in a captured image, the distance from the camera position C to the first calibration plane $S_1$. The map generation unit 43 may generate a map $M_2$ that defines, with regard to each coordinate point in a captured image, the distance from the camera position C to the second calibration plane $S_2$.

Projection Control

The output control unit 44 according to the present modification controls projection of the drawing information, further on the basis of the coordinates of the intersection point between the imaging optical axis 13 and each of the first calibration plane $S_1$ and the second calibration plane $S_2$ and the coordinates of the intersection point between the projection optical axis 23 and each of the first calibration plane $S_1$ and the second calibration plane $S_2$. In other words, the output control unit 44 controls projection of the drawing information on the basis of the coordinates of the center point of the imaging angular field of view 11 and the coordinates of the center point of the projection angular field of view 21 on each of the first calibration plane $S_1$ and the second calibration plane $S_2$ (that is, $C_{s1}$, $C_{s2}$, $P_{s1}$, and $P_{s2}$).

Specifically, the output control unit 44 calculates a differential $v_{offset}$ of the two-dimensional vector $v\_P_{S2}C_{S2}$ relative to the two-dimensional vector $v\_P_{S1}C_{S1}$ in accordance with the following equation.

$$v_{offset} = H_2 - H_1 \quad (9)$$

Moreover, the output control unit 44 compares the distance from the camera position C to the first calibration plane $S_1$ with the distance from the camera position C to the second calibration plane $S_2$. Specifically, the output control unit 44 compares the distance from the camera position C to a first point on the first calibration plane $S_1$ with the distance from the camera position C to a second point on the second calibration plane $S_2$, where the first point and the second point have the same coordinates in a captured image. For example, assuming that the comparison is made through a ratio calculation, the ratio information (that is, the ratio) k is defined by the following equation.

$$k = (h_1 + h_3)/h_1 \quad (10)$$

Here, the distances from the camera position C to the first point and the second point, respectively, are obtained by, for example, using the radii of the light-emitting circles provided when the digital pen 50 is located at the first point and the second point, respectively. Letting $r(d_1)$ be the radius provided when the digital pen 50 is located at the first point $d_1$ and letting $r(d_2)$ be the radius provided when the digital pen 50 is located at the second point $d_2$, the ratio information k is obtained by the following equation.

$$k = r(d_1)/r(d_2) \quad (11)$$

Each of $r(d_1)$ and $r(d_2)$ may be acquired by causing the user to locate the digital pen 50 at each of the first point and the second point. For example, first, when the user locates the digital pen 50 at any point on the first calibration plane $S_1$, the output control unit 44 stores the point as the first point and acquires the radius $r(d_1)$ of the light-emitting circle at the first point. Next, the output control unit 44 controls projection of information onto the second calibration plane $S_2$, the information being intended for identifying the second point. For example, the output control unit 44 sequentially causes points of light observable by the imaging unit 10 (visible light, for example) to be projected on the second calibration plane $S_2$ at various coordinate points. Then, the output control unit 44 identifies the second point by detecting the point of light projected at the same coordinates as the first point in a captured image. Such an identification method is also called a sequential search. Then, the output control unit 44 acquires the radius $r(d_2)$ of the light-emitting circle at the second point by causing guide information indicating the identified second point to be projected on the plane so that the user locates the digital pen 50 at the second point.

On the other hand, $r(d_1)$ may be acquired by referring to the coordinates of the first point in a captured image on the map $M_1$. In this case, the user operation of locating the digital pen 50 at the first point is omitted. Likewise, if the map $M_2$ is generated, $r(d_2)$ may be acquired by referring to the coordinates of the second point in a captured image on the map $M_2$. In this case, the user operation of locating the digital pen 50 at the second point is omitted.

On the basis of the ratio information k obtained by the above-described comparison, the output control unit 44 controls projection of the drawing information. Specifically, the ratio information k reveals the relationship in which a translational movement by $v_{offset}$ occurs when the distance along a depth direction from the camera position C to the digital pen 50 becomes k times the distance from the camera position C to the first calibration plane $S_1$. Therefore, the output control unit 44 uses this relationship to calculate a projective transformation matrix H' on the drawing surface S', and uses the projective transformation matrix H' to control the coordinates of the drawing information. The following describes a method for calculating the projective transformation matrix H' in detail.

Assuming that $h_1$=1, the above mathematical expression (10) is transformed into the following equation.

$$k=1+h_3 \quad (12)$$

The assumption that $h_1$=1 is equivalent to setting the radius $r(d_1)$ of the light-emitting circle on the map $M_1$ to 1. As a result, the map $M_2$ of the second calibration plane $S_2$ is a map with the light-emitting circle whose radius is at a certain ratio relative to the radius $r(d_1)$ of the light-emitting circle on the map $M_1$. That is, the map $M_2$ is obtained in accordance with the following equation.

$$M_2=(1/k) \times M_1 \quad (13)$$

When the user locates the digital pen 50 at any position d' on the drawing surface S', the position acquisition unit 41 acquires the radius $r(d')$ of the light-emitting circle at the position d'. Then, the output control unit 44 refers to the map $M_1$ to acquire the radius $r(d_1)$ of the light-emitting circle at the coordinates $(x_d, y_d)=(x_{d'}, y_{d'})$. Then, on the basis of the acquired $r(d_1)$, the output control unit 44 calculates the ratio k' between the first distance and the second distance in accordance with the following equation, which is similar to the mathematical expression (5) above.

$$k'=r(d_1)/r(d') \quad (14)$$

Next, the output control unit 44 calculates, in accordance with the following equation, a differential $(v_{offset})'$ of the two-dimensional vector $v\_P_{S2'}C_{S2'}$ relative to the two-dimensional vector $v\_P_{S1}C_{S1}$, the differential representing a physical mismatch between the centers of the angular fields of view on the drawing surface S'.

$$(v_{offset})'=(k'/k) \times v_{offset} \quad (15)$$

Then, the output control unit 44 calculates a projective transformation matrix H' on the drawing surface S' in accordance with the following equation.

$$H'=H_1+(v_{offset})' \quad (16)$$

Supplementary Information

Note that the algorithm of the present modification is based on $h_1$=$h_2$. However, when $h_1 \neq h_2$, the algorithm of the present modification can be still applied by estimating $h_2$ through distance measurement or calibration.

In addition, the drawing surface S' may be a curved surface. This matter is explained below with reference to FIG. 19.

Figure 19:
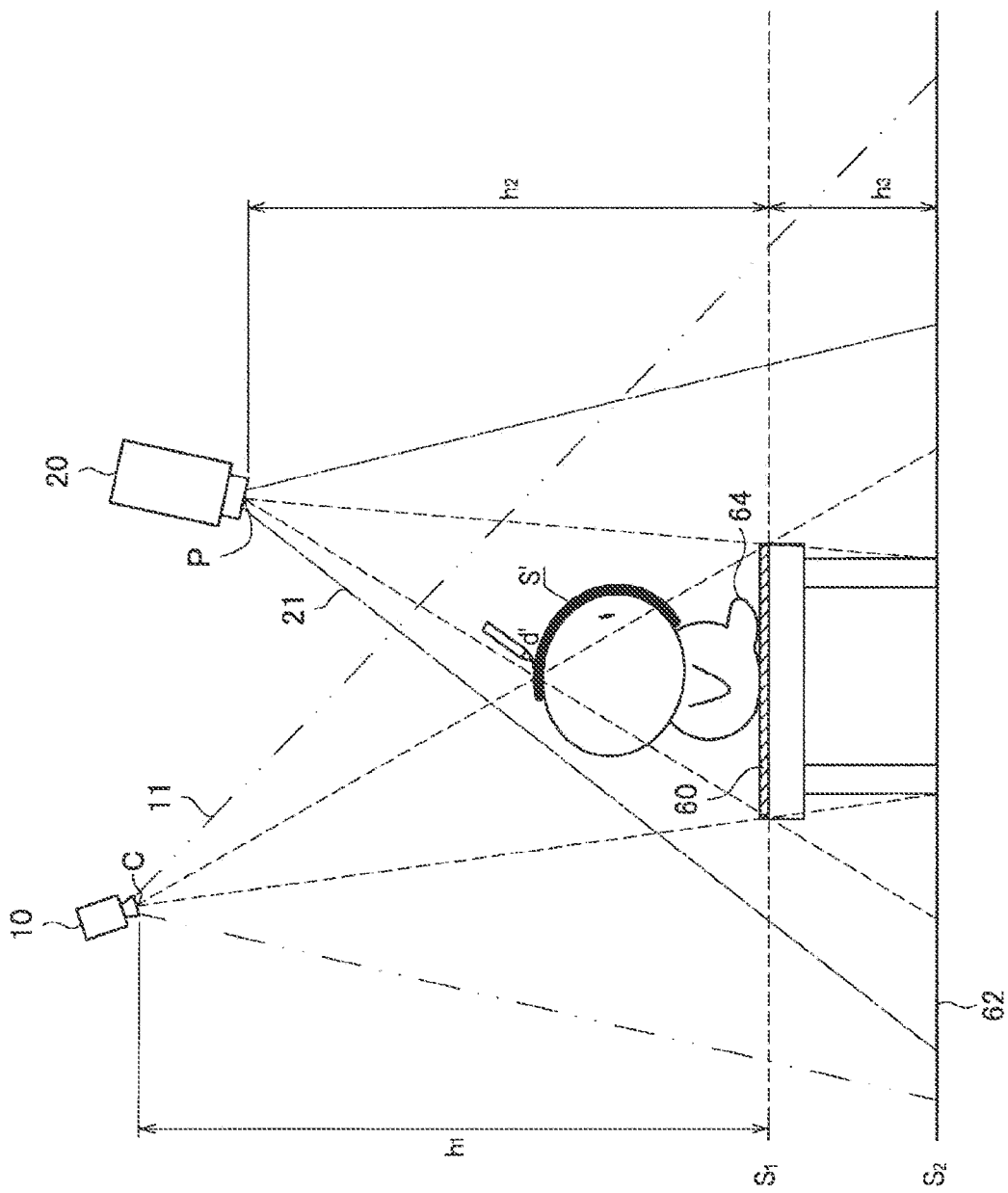
FIG. 19 is a diagram for explaining an example use of the drawing system according to the present modification.

FIG. 19 is a diagram for explaining an example use of the drawing system 1 according to the present modification. As illustrated in FIG. 19, a doll 64 is placed on the tabletop surface 60, and a surface of the doll 64 serves as the drawing surface S'. As illustrated in FIG. 19, the surface of the doll 64 is curved. The drawing surface S' may be a surface of a three-dimensional object in any shape having a curved surface and the like. However, the above-described algorithm assumes that the first calibration plane $S_1$, the second calibration plane $S_2$, and the drawing surface S' are parallel. For this reason, in a case where the drawing surface S' is curved, the area of the position d' of the digital pen 50 in the drawing surface S' is segmentalized so that the area is regarded as parallel to the first calibration plane $S_1$ and the second calibration plane $S_2$, and then the above-described algorithm is applied.

5. EXAMPLE HARDWARE CONFIGURATION

Figure 20:
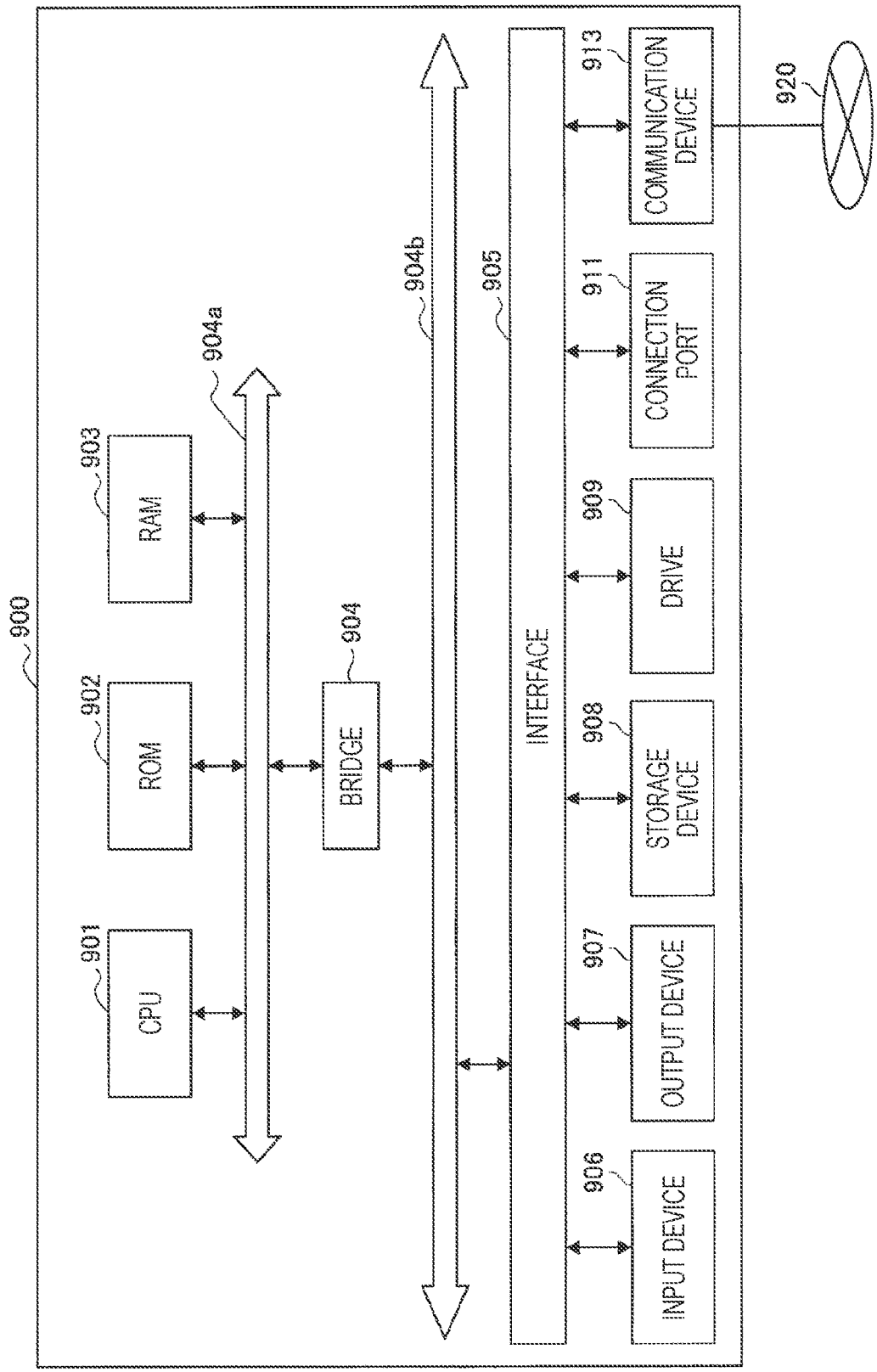
FIG. 20 is a block diagram illustrating an example hardware configuration of an information processing device according to the present embodiment.

Finally, a hardware configuration of the information processing device according to the present embodiment will be described with reference to FIG. 20. FIG. 20 is a block diagram illustrating an example hardware configuration of the information processing device according to the present embodiment. Note that an information processing device 900 illustrated in FIG. 20 can implement the drawing system 1 illustrated in FIGS. 4, 12, and 13, for example. Information processing by the drawing system 1 according to the present embodiment is implemented by software and the hardware described below in collaboration with each other.

As illustrated in FIG. 20, the information processing device 900 includes a central processing unit (CPU) 901, a read only memory (ROM) 902, a random access memory (RAM) 903, and a host bus 904a. Furthermore, the information processing device 900 includes a bridge 904, an external bus 904b, an interface 905, an input device 906, an output device 907, a storage device 908, a drive 909, a connection port 911, and a communication device 913. The information processing device 900 may include a processing circuit, such as an electric circuit, a DSP, or an ASIC, in place of or in addition to the CPU 901.

The CPU 901, which functions as an arithmetic processing device and a control device, controls the overall operation in the information processing device 900 in accordance with various programs. Furthermore, the CPU 901 may be a microprocessor. The ROM 902 stores programs, operation parameters, and the like to be used by the CPU 901. The RAM 903 temporarily stores programs to be used during the execution by the CPU 901, parameters that appropriately vary during the execution, and the like. The CPU 901 may be included in, for example, the projection control unit 40 illustrated in FIGS. 4, 12, and 13.

The CPU 901, the ROM 902, and the RAM 903 are connected to one another by the host bus 904*a* including a CPU bus or the like. The host bus 904*a* is connected to the external bus 904*b* such as a peripheral component interconnect/interface (PCI) bus via the bridge 904. Note that the host bus 904*a*, the bridge 904, and the external bus 904*b* may not necessarily be included separately but these functions may be implemented in a single bus.

The input device 906 may include a device that detects information regarding a drawing tool. For example, the input device 906 may include various sensors such as an image sensor (for example, a camera), a depth sensor (for example, a stereo camera), an acceleration sensor, a gyro sensor, a geomagnetic sensor, an optical sensor, a sound sensor, a distance measuring sensor, and a force sensor. Furthermore, the input device 906 may acquire information regarding the state of the drawing tool itself such as the attitude and moving speed of the drawing tool, and information regarding the surrounding environment of the information processing device 900 such as illuminance and noise around the drawing tool. In addition, the input device 906 may include a Global Navigation Satellite System (GNSS) module that receives a GNSS signal (for example, a global positioning system (GPS) signal from a GPS satellite) from a GNSS satellite and measures the position information including the latitude, longitude, and altitude of the device. Furthermore, regarding the position information, the input device 906 may detect positions through transmission and reception to and from Wi-Fi (registered trademark), a mobile phone, a PHS, a smart phone, or the like, or through short-range communication or the like. The input device 906 may include, for example, the imaging unit 10 shown in FIG. 4, the distance measuring unit 12 shown in FIG. 12, and the inertial sensor unit 16 shown in FIG. 13.

The output device 907 includes a device that can visually or audibly give notification of the acquired information to the user. Examples of such a device include display devices such as a laser projector, an LED projector, and a lamp, sound output devices such as a speaker and a headphone, printer devices, and the like. The output device 907 outputs, for example, results obtained by the information processing device 900 performing various types of processing. Specifically, the display device visually displays results obtained by the information processing device 900 performing various types of processing in various forms such as text, images, tables, graphs, and the like. On the other hand, the audio output device converts an audio signal including the reproduced audio data, acoustic data, and the like into an analog signal, and audibly outputs the analog signal. The aforementioned display device may be included in, for example, the projection unit 20 shown in FIGS. 4, 12, and 13.

The storage device 908 is a data storage device formed as an example of the storage unit in the information processing device 900. The storage device 908 is implemented by, for example, a magnetic storage device such as an HDD, a semiconductor storage device, an optical storage device, or a magneto-optical storage device. The storage device 908 may include a storage medium, a recording device that records data on the storage medium, a reading device that reads data from the storage medium, a deletion device that deletes data recorded on the storage medium, and the like.

The storage device 908 stores programs to be executed by the CPU 901 and various types of data, as well as various types of data acquired from the outside and other data. The storage device 908 may be included in, for example, the storage unit 30 shown in FIGS. 4, 12, and 13.

The drive 909 is a reader/writer for a storage medium, and is built in or externally attached to the information processing device 900. The drive 909 reads information recorded on the attached removable storage medium, such as a magnetic disk, an optical disk, a magneto-optical disk, or a semiconductor memory, and outputs the information to the RAM 903. Furthermore, the drive 909 is capable of writing information to the removable storage medium.

The connection port 911, which is an interface connected to an external device, is a connection port connected to an external device and is capable of transmitting data by Universal Serial Bus (USB), for example.

The communication device 913 is, for example, a communication interface including a communication device or the like for connecting to the network 920. The communication device 913 is, for example, a communication card or the like for a wired or wireless local area network (LAN), Long Term Evolution (LTE), Bluetooth (registered trademark), or wireless USB (WUSB). Alternatively, the communication device 913 may be a router for optical communication, a router for asymmetric digital subscriber line (ADSL), a modem for various types of communication, or the like. The communication device 913 is capable of transmitting and receiving signals and the like to and from, for example, the Internet or another communication device in accordance with a predetermined protocol such as TCP/IP. The communication device 913 can be used for communication with the projection control unit 40 and the digital pen 50.

Note that the network 920 is a wired or wireless transmission path for information transmitted from a device connected to the network 920. For example, the network 920 may include a public line network such as the Internet, a telephone line network, or a satellite communication network, any of various local area networks (LANs) including Ethernet (registered trademark) or wide area networks (WANs), and the like. Furthermore, the network 920 may include a private line network such as an Internet Protocol-Virtual Private Network (IP-VPN).

The foregoing has described an example of a hardware configuration that can implement functions of the information processing device 900 according to the present embodiment. Each of the above-described components may be implemented by using a general-purpose member, or may be implemented by using the hardware specialized for the functions of each of the components. Therefore, the hardware configuration to be used can be changed as appropriate in accordance with the technical level on an occasion of carrying out the present embodiment.

Note that it is possible to create a computer program for achieving the functions of the information processing device 900 according to the present embodiment as described above, and implement the computer program on a PC or the like. Furthermore, it is also possible to provide a computer-readable recording medium containing such a computer program. The recording medium is, for example, a magnetic disk, an optical disk, a magneto-optical disk, a flash memory, or the like. Furthermore, the above-described computer program may be distributed via, for example, a network without using a recording medium.

6. CONCLUSION

An embodiment of the present disclosure has been described above in detail with reference to FIGS. 1 to 20. As described above, the projection control unit 40 according to the present embodiment controls projection of drawing information performed by the projection unit 20 on the basis of the ratio information between a first distance and a second distance, the first distance being from the reference point to the digital pen 50 as acquired from sensing information regarding the digital pen 50, and the second distance being from the reference point to the intersection point between the straight line connecting the reference point with the digital pen 50 and the calibration plane. According to the present embodiment, the ratio information between the first distance and the second distance is used for projection control of the drawing information. More specifically, on the basis of the ratio information between the first distance and the second distance, a projective transformation matrix H' specialized for the position d' of the digital pen 50 in drawing operation on the drawing surface S' is generated in real time from a projective transformation matrix H on the calibration plane S. As a result, it is made possible to suppress the occurrence of a mismatch between the position of the digital pen 50 on the drawing surface S' and the position of the drawing information projected on the drawing surface S', the mismatch occurring when the projective transformation matrix H on the calibration plane S is used as it is. Since the projective transformation matrix H' is generated in real time, the present technology is effective when, for example, an image is projected onto a surface of a moving real object. Furthermore, since it is unnecessary to perform a calibration for each drawing surface S', the present technology is also effective for projection on a non-flat, curved or uneven surface. Furthermore, since the projector position P is not involved in the calculation of the projective transformation matrix H', the present technology can be applied to the case where the projector position P is unknown.

The occurrence of a mismatch of positions described above causes a significant trouble in a drawing operation or the like of characters or pictures, the operation being continued with reference to the trail produced immediately before the drawing. In this regard, according to the present embodiment, it is made possible to provide a comfortable drawing experience to the user because the occurrence of a mismatch of positions is suppressed.

Furthermore, in the present embodiment, at least one of the size, the brightness, or the color of drawing information may be controlled, in addition to the coordinates of the drawing information. Therefore, the result of drawing on various places in the real space with the digital pen 50 can be made look like the drawing made with an analog pen. For example, to consider a color of a carpet and tablecloth to be placed in a room, when the user paints the same color thereon with the digital pen 50, the user will have difficulty in deciding a color if the carpet and tablecloth appear in a different color. In this regard, the present embodiment allows the user to make a practical study more smoothly because a certain color painted on any place in the real space appears in that color.

Preferred embodiments of the present disclosure have been described above in detail with reference to the accompanying drawings, but the technical scope of the present disclosure is not limited to these examples. It is apparent that a person having ordinary knowledge in the technical field of the present disclosure can arrive at various changes or modifications within the scope of the technical idea described in the claims, and it is naturally understood that these changes and modifications belong to the technical scope of the present disclosure.

For example, the mapping of the drawing system 1 described in the above embodiment to devices may be done in various possible ways. For example, the storage unit 30 and the projection control unit 40 may be formed as a single information processing device, or may be disposed in a server on a cloud. Alternatively, the storage unit 30 and the projection control unit 40 may be disposed on the imaging unit 10, on the projection unit 20, or on the digital pen 50.

Furthermore, process steps described herein with reference to flowcharts and sequence diagrams may not necessarily be carried out in the order as illustrated. Some processing steps may be performed in parallel. Furthermore, additional process steps may be employed, and some process steps may be omitted.

Furthermore, the effects described herein are merely illustrative or exemplary effects, and are not restrictive. That is, in addition to or in place of the effects described above, the technology according to the present disclosure can provide other effects that are obvious to those skilled in the art from the descriptions herein.

Note that the following configurations also belong to the technical scope of the present disclosure.

(1)

An information processing device including:

a projection control unit that controls projection of drawing information, the projection being performed by a projection device, on the basis of ratio information between a first distance and a second distance, the first distance being acquired from sensing information regarding a drawing tool and being from a reference point to the drawing tool, and the second distance being from the reference point to an intersection point between a straight line connecting the reference point with the drawing tool and a calibration plane.

(2)

The information processing device according to (1), in which the ratio information is based on a ratio between the first distance and the second distance.

(3)

The information processing device according to (1) or (2), in which the projection control unit controls coordinates of the drawing information in a projected image projected by the projection device.

(4)

The information processing device according to any one of (1) to (3), in which the projection control unit controls a size of the drawing information in a projected image projected by the projection device.

(5)

The information processing device according to any one of (1) to (4), in which the projection control unit controls brightness of the drawing information in a projected image projected by the projection device.

(6)

The information processing device according to any one of (1) to (5), in which the projection control unit controls a color of the drawing information in a projected image projected by the projection device.

(7)

The information processing device according to any one of (1) to (6), in which the calibration plane is a plane of a surface of a calibration target object and a plane obtained by virtually extending the plane of the surface of the calibration target object.

(8)

The information processing device according to any one of (1) to (7), in which the sensing information includes a captured image, and a position of the reference point includes a position of an imaging device that captures the captured image.

(9)

The information processing device according to (8), in which the projection control unit acquires the first distance on the basis of a size of a specific portion of the drawing tool, the specific portion appearing in the captured image.

(10)

The information processing device according to (9), in which the projection control unit acquires the first distance on the basis of a size of a shape of light emitted from the drawing tool, the shape appearing in the captured image.

(11)

The information processing device according to any one of (8) to (10), in which the projection control unit generates a map that defines a distance from the reference point to the calibration plane with respect to each coordinate point in the captured image, and acquires, as the second distance, a distance defined in the map with respect to a coordinate point corresponding to the coordinate point of the drawing tool included in the captured image.

(12)

The information processing device according to (11), in which the map is generated on the basis of a size of a specific portion of the drawing tool, the specific portion appearing in the captured image, in a case where the drawing tool is located at a plurality of points on the calibration plane.

(13)

The information processing device according to (11), in which the map is generated on the basis of a distance to the drawing tool, the distance being acquired by a distance measuring sensor, in a case where the drawing tool is located at a plurality of points on the calibration plane.

(14)

The information processing device according to any one of (11) to (13), in which the projection control unit controls projection of the drawing information further on the basis of coordinates of an intersection point between an optical axis of the imaging device and each of the calibration plane and another calibration plane, and coordinates of an intersection point between an optical axis of the projection device and each of the calibration plane and the another calibration plane.

(15)

The information processing device according to (14), in which the projection control unit controls projection of the drawing information on the basis of the ration information between a distance from the reference point to a first point on the calibration plane and a distance from the reference point to a second point on the another calibration plane, the first point and the second point having the same coordinates on the captured image.

(16)

The information processing device according to (15), in which the projection control unit controls projection of information for identifying the second point onto the another calibration plane.

(17)

The information processing device according to any one of (1) to (7), in which the projection control unit controls projection of the drawing information, the projection being performed by the projection device, on the basis of a three-dimensional position of the drawing tool in a case where the drawing tool is located at a plurality of known points on a projected image projected on the calibration plane and the another calibration plane and a three-dimensional position of the drawing tool in drawing operation.

(18)

The information processing device according to (17), in which the projection control unit generates a projective transformation matrix for converting the three-dimensional position on the calibration plane into coordinates in a projected image projected by the projection device, on the basis of a three-dimensional position of the drawing tool in a case where the drawing tool is located at a plurality of known points in a projected image projected on the calibration plane and the another calibration plane.

(19)

An information processing method including:

controlling projection of drawing information, the projection being performed by a projection device, on the basis of ratio information between a first distance and a second distance, the first distance being acquired from sensing information regarding a drawing tool and being from a reference point to the drawing tool, and the second distance being from the reference point to an intersection point between a straight line connecting the reference point with the drawing tool and a calibration plane.

(20)

A recording medium recording a program that causes a computer to function as:

a projection control unit that controls projection of drawing information, the projection being performed by a projection device, on the basis of ratio information between a first distance and a second distance, the first distance being acquired from sensing information regarding a drawing tool and being from a reference point to the drawing tool, and the second distance being from the reference point to an intersection point between a straight line connecting the reference point with the drawing tool and a calibration plane.

REFERENCE SIGNS LIST

1 Drawing system
10 Imaging unit
11 Imaging angular field of view
12 Distance measuring unit
16 Inertial sensor unit
20 Projection unit
21 Projection angular field of view
30 Storage unit
40 Projection control unit
41 Position acquisition unit
42 Calibration unit
43 Map generation unit
44 Output control unit
50 Digital pen
60 Tabletop surface
61 Auxiliary board
62 Floor surface
64 Doll
66 Bench seat surface

The invention claimed is:

1. An information processing device, comprising:
a projection control unit configured to control a projection device to project drawing information based on a three-dimensional position of a drawing tool in a drawing operation and ratio information between a first distance and a second distance, wherein the drawing tool is at a plurality of points of an image projected on a first calibration plane and a second calibration plane located parallel to the first calibration plane, the first distance is acquired from sensing information regarding the drawing tool, the first distance is a distance from a reference point to the drawing tool, and the second distance is a distance from the reference point to an intersection point between a straight line connecting the reference point with the drawing tool and the first calibration plane.

2. The information processing device according to claim 1, wherein the ratio information is based on a ratio between the first distance and the second distance.

3. The information processing device according to claim 1, wherein the projection control unit is further configured to control coordinates of the drawing information in the image projected by the projection device.

4. The information processing device according to claim 1, wherein the projection control unit is further configured to control a size of the drawing information in a projected image projected by the projection device.

5. The information processing device according to claim 1, wherein the projection control unit is further configured to control brightness of the drawing information in the image projected by the projection device.

6. The information processing device according to claim 1, wherein the projection control unit is further configured to control a color of the drawing information in the image projected by the projection device.

7. The information processing device according to claim 1, wherein the first calibration plane is a plane of a surface of a calibration target object and a plane obtained by virtually extending the plane of the surface of the calibration target object.

8. The information processing device according to claim 1, wherein
the sensing information includes a captured image, and
a position of the reference point includes a position of an imaging device that captures the captured image.

9. The information processing device according to claim 8, wherein
the projection control unit is further configured to acquire the first distance based on a size of a specific portion of the drawing tool, and
the specific portion appears in the captured image.

10. The information processing device according to claim 9, wherein
the projection control unit is further configured to acquire the first distance based on a size of a shape of light emitted from the drawing tool, and
the shape appears in the captured image.

11. The information processing device according to claim 8, wherein the projection control unit is further configured to:
generate a map that defines a distance from the reference point to the calibration plane with respect to each coordinate point in the captured image; and
acquire, as the second distance, a distance defined in the map with respect to a coordinate point corresponding to a coordinate point of the drawing tool included in the captured image.

12. The information processing device according to claim 11, wherein the map is generated based on a size of a specific portion of the drawing tool in a case where the drawing tool is at a plurality of points on the first calibration plane, and the specific portion appears in the captured image.

13. The information processing device according to claim 11, wherein
the map is generated based on a distance to the drawing tool in a case where the drawing tool at a plurality of points on the first calibration plane, and
a distance measuring sensor acquires the distance.

14. The information processing device according to claim 11, wherein the projection control unit is further configured to control projection of the drawing information based on coordinates of an intersection point between an optical axis of the imaging device and each of the first calibration plane and the second calibration plane, and coordinates of an intersection point between an optical axis of the projection device and each of the first calibration plane and the second calibration plane.

15. An information processing method, comprising:
controlling a projection device to project drawing information based on a three-dimensional position of a drawing tool in a drawing operation and ratio information between a first distance and a second distance, wherein
the drawing tool is at a plurality of points of an image projected on a first calibration plane and a second calibration plane located parallel to the first calibration plane,
the first distance is acquired from sensing information regarding the drawing tool,
the first distance is a distance from a reference point to the drawing tool, and
the second distance is a distance from the reference point to an intersection point between a straight line connecting the reference point with the drawing tool and the first calibration plane.

16. The information processing device according to claim 15, wherein the projection control unit is further configured to control projection of information for identifying the second point onto the second calibration plane.

17. The information processing device according to claim 1, wherein
the projection control unit is further configured to generate a projective transformation matrix for converting the three-dimensional position on the calibration plane into coordinates in the image projected by the projection device, and
the projective transformation matrix is projected based on the three-dimensional position of the drawing tool in a case where the drawing tool is at the plurality of points in the image projected on the first calibration plane and the second calibration plane.

18. An information processing method, comprising:
controlling a projection device to project of drawing information based on a three-dimensional position of a drawing tool in a drawing operation and ratio information between a first distance and a second distance, wherein
the drawing tool is at a plurality of points on an image projected on a first calibration plane and a second calibration plane,
the first distance is acquired from sensing information regarding the drawing tool,
the first distance is a distance from a reference point to the drawing tool, and the second distance is a distance from the reference point to an intersection point between a straight line connecting the reference point with the drawing tool and the first calibration plane.

19. A non-transitory computer-readable medium having stored thereon, computer-executable instructions which, when executed by a computer, cause the computer to execute operations, the operations comprising:

controlling a projection device to project drawing information based on a three-dimensional position of a drawing tool in a drawing operation and ratio information between a first distance and a second distance, wherein the drawing tool is at a plurality of points of an image projected on a first calibration plane and a second calibration plane located parallel to the first calibration plane, the first distance is acquired from sensing information regarding the drawing tool, the first distance is a distance from a reference point to the drawing tool, and the second distance is a distance from the reference point to an intersection point between a straight line connecting the reference point with the drawing tool and the first calibration plane.

* * * * *